United States Patent
Helou, Jr.

(10) Patent No.: US 10,549,868 B2
(45) Date of Patent: Feb. 4, 2020

(54) SPACE SHUTTLE ORBITER AND RETURN SYSTEM

(71) Applicant: Biosphere Aerospace LLC, Carpinteria, CA (US)

(72) Inventor: Elie Helou, Jr., Santa Barbara, CA (US)

(73) Assignee: Biosphere Aerospace LLC, Carpinteria, CA (US)

( * ) Notice: Subject to any disclaimer, the term of this patent is extended or adjusted under 35 U.S.C. 154(b) by 0 days.

(21) Appl. No.: 15/451,001

(22) Filed: Mar. 6, 2017

(65) Prior Publication Data

US 2017/0313443 A1    Nov. 2, 2017

Related U.S. Application Data

(60) Continuation of application No. 14/736,782, filed on Jun. 11, 2015, now Pat. No. 9,586,700, which is a
(Continued)

(51) Int. Cl.
  *B64G 1/00* (2006.01)
  *B64G 1/14* (2006.01)
  (Continued)

(52) U.S. Cl.
  CPC ............. *B64G 1/005* (2013.01); *B64G 1/002* (2013.01); *B64G 1/14* (2013.01); *B64G 1/22* (2013.01);
  (Continued)

(58) Field of Classification Search
  CPC . B64G 1/005; B64G 1/14; B64G 1/62; B64G 1/22; B64G 1/58; B64G 1/401;
  (Continued)

(56) References Cited

U.S. PATENT DOCUMENTS 3,256,816 A * 6/1966 Pilcher, II ............. F42B 12/105
                                                         102/374
3,295,789 A    1/1967 Hill
(Continued)

FOREIGN PATENT DOCUMENTS

FR          2940248        6/2010
WO          0043267        7/2000
WO     WO 2007065175 A2    6/2007

OTHER PUBLICATIONS

International Search Report and Written Opinion of the International Searching Authority in Application No. PCT/US2014/034129, dated Aug. 28, 2014.

*Primary Examiner* — Brian M O'Hara
*Assistant Examiner* — Michael B. Kreiner
(74) *Attorney, Agent, or Firm* — Sheppard, Mullin, Richter & Hampton LLP

(57) ABSTRACT

A launch system comprises a nose section comprising a nose coupling surface, a tail section comprising a tail coupling surface facing the nose coupling surface and a mast coupling the nose and tail sections. The mast is configured to expand and retract to displace the nose and tail sections within a range of distances from one another. In a retracted state, the nose and tail sections are either structurally coupled to one another at the nose and tail coupling surfaces or structurally coupled to at least one integrated module located between the nose and the tail sections.

17 Claims, 25 Drawing Sheets

Related U.S. Application Data division of application No. 13/870,916, filed on Apr. 25, 2013, now Pat. No. 9,073,647.

(51) Int. Cl.
- B64G 1/22 (2006.01)
- B64G 1/40 (2006.01)
- B64G 1/58 (2006.01)
- B64G 1/62 (2006.01)
- B64G 1/10 (2006.01)

(52) U.S. Cl.
CPC ............... B64G 1/222 (2013.01); B64G 1/40 (2013.01); B64G 1/401 (2013.01); B64G 1/403 (2013.01); B64G 1/58 (2013.01); B64G 1/62 (2013.01); *B64G 2001/1092* (2013.01)

(58) Field of Classification Search
CPC .......... B64G 1/40; B64G 1/002; B64G 1/403; B64G 1/222; B64G 2001/1092; F42B 15/36
See application file for complete search history.

(56) References Cited

U.S. PATENT DOCUMENTS

| | | | |
|---|---|---|---|
| 3,304,865 A | 2/1967 | Gungle | |
| 3,369,771 A | 2/1968 | Walley et al. | |
| 3,608,848 A * | 9/1971 | Cantor | B64G 1/646 244/172.4 |
| 3,702,688 A | 11/1972 | Faget | |
| 3,703,265 A | 11/1972 | Troitino | |
| 3,753,536 A | 8/1973 | White | |
| 4,334,391 A | 6/1982 | Hedgepeth et al. | |
| 4,452,412 A | 6/1984 | von Pragenau | |
| 4,480,415 A | 11/1984 | Truss | |
| 4,557,097 A | 12/1985 | Mikulas, Jr. et al. | |
| 4,575,029 A | 3/1986 | Hardwood et al. | |
| 4,580,377 A | 4/1986 | Sundin | |
| 4,587,777 A | 5/1986 | Vasques et al. | |
| 4,599,832 A | 7/1986 | Benton et al. | |
| 4,662,130 A | 5/1987 | Miuras et al. | |
| 4,667,908 A | 5/1987 | Hayden et al. | |
| 4,677,803 A | 7/1987 | Mikulas, Jr. et al. | |
| 4,738,583 A | 4/1988 | Macconochie | |
| 4,772,175 A | 9/1988 | Grimaldi | |
| 4,796,839 A | 1/1989 | Davis | |
| 4,834,324 A | 5/1989 | Criswell | |
| 4,844,380 A * | 7/1989 | Peoples | B64G 1/002 244/3.22 |
| 4,864,784 A | 9/1989 | Binge et al. | |
| 4,884,770 A | 12/1989 | Martin | |
| 5,064,151 A * | 11/1991 | Cerimele | B64G 1/62 244/172.1 |
| 5,085,018 A | 2/1992 | Kitamura et al. | |
| 5,154,027 A | 10/1992 | Warden | |
| 5,190,246 A | 3/1993 | MacConochie | |
| 5,217,187 A | 6/1993 | Criswell | |
| 5,228,644 A | 7/1993 | Garriott et al. | |
| 5,350,138 A | 9/1994 | Culbertson et al. | |
| 5,356,097 A | 10/1994 | Chalupa | |
| 5,402,965 A | 4/1995 | Cervisi et al. | |
| 5,857,648 A | 1/1999 | Dailey et al. | |
| 5,975,464 A | 11/1999 | Rutan | |
| 6,193,187 B1 | 2/2001 | Scott et al. | |
| 6,360,994 B2 | 3/2002 | Hart et al. | |
| 6,450,452 B1 | 9/2002 | Spencer et al. | |
| 6,467,731 B1 * | 10/2002 | Harris | B64G 1/58 244/159.1 |
| 6,547,476 B2 * | 4/2003 | Kaszubowski | B64G 1/641 244/158.1 |
| 6,557,803 B2 | 5/2003 | Carpenter et al. | |
| 6,612,522 B1 | 9/2003 | Aldrin et al. | |
| 6,666,409 B2 | 12/2003 | Carpenter et al. | |
| 6,685,141 B2 | 2/2004 | Penn | |
| 6,789,767 B2 | 9/2004 | Mueller et al. | |
| 6,827,313 B1 | 12/2004 | Aldrin | |
| 6,904,722 B2 | 6/2005 | Brown | |
| 6,932,302 B2 | 8/2005 | Martin | |
| 6,970,143 B2 | 11/2005 | Allen et al. | |
| 7,028,442 B2 | 4/2006 | Merrifield | |
| 7,114,682 B1 * | 10/2006 | Kistler | B64G 1/40 244/172.2 |
| 7,219,859 B2 | 5/2007 | Johnson | |
| 7,261,257 B2 | 8/2007 | Helou, Jr. | |
| 7,963,084 B2 | 6/2011 | Merrifield et al. | |
| 8,678,321 B2 | 3/2014 | Bezos et al. | |
| 2008/0283670 A1 | 11/2008 | Harvey et al. | |
| 2009/0140101 A1 | 6/2009 | Salked | |
| 2009/0302166 A1 | 12/2009 | Meyers | |
| 2010/0167622 A1 | 7/2010 | Zeek | |
| 2010/0276538 A1 | 11/2010 | Helou, Jr. | |
| 2013/0087659 A1 | 4/2013 | Prampolini | |

* cited by examiner

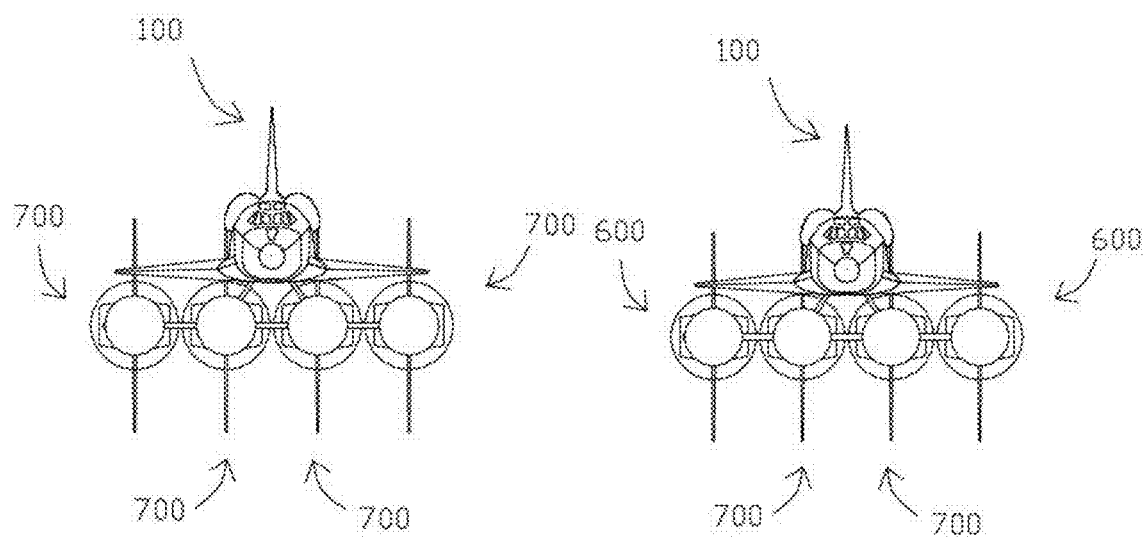
*Figure 27*  *Figure 28*

SPACE SHUTTLE ORBITER AND RETURN SYSTEM

CROSS-REFERENCE TO RELATED APPLICATIONS

This application is a continuation of U.S. patent application Ser. No. 14/736,782, filed Jun. 11, 2015, entitled "SPACE SHUTTLE ORBITER AND RETURN SYSTEM," which is a divisional of U.S. patent application Ser. No. 13/870,916, filed Apr. 25, 2013, now U.S. Pat. No. 9,073,647, issued on Jul. 7, 2015, entitled "SPACE SHUTTLE ORBITER AND RETURN SYSTEM," the entireties of which are hereby incorporated by reference as if fully set forth herein.

FIELD OF THE INVENTION

The present invention relates generally to space systems and, more particularly, to a space shuttle orbiter or rocket that is configured to deliver a payload module, or assist in delivering a payload module, and to return with the relatively expensive components of the orbiter or rocket.

BACKGROUND

Space launch systems have long been used to transfer payload modules into orbit and beyond. One significant shortcoming associated with known space launch systems is that they typically have fixed structures and are therefore incapable of being adapted to the weight and size of the payload module that they are transporting. Because space launch systems typically transport one or more payload modules that have varying weight and/or sizes, the space launch systems are oftentimes fuel and/or structurally inefficient.

There have been continuing efforts at making the entire launch system reusable. Inherent in such designs, however, are higher structural weight and design considerations which make such structures expensive. Additionally, because such systems include a significant amount of dead weight, which must be transported back after the payload is released, they have high fuel requirements which translate to significant additional system costs.

There is therefore a need for a space launch system which is adaptable to the weight and size of a particular payload module that can return with the relatively expensive components, such as the electronics and the engines, for re-use.

BRIEF SUMMARY

It is understood that the principles underlying the basic configuration of the orbiter may also have other applications in which it is desired to have a vehicle that permits the ability to reuse certain components while at the same time permitting for the disposal of components that are relatively inexpensive compared to the reused components.

In one embodiment, a launch system is described. The launch system comprises a nose section comprising a nose coupling surface and a tail section comprising a tail coupling surface facing the nose coupling surface. A mast couples the nose and tail sections, the mast being configured to expand and retract to displace the nose and tail sections within a range of distances from one another. In a retracted state, the nose and tail sections are either structurally coupled to one another at the nose and tail coupling surfaces or structurally coupled to at least one integrated module located between the nose and the tail sections.

In a preferred embodiment, the integrated module is permanently affixed to one of the nose and tail sections and is not intended to be released or removed from the launch system. The other one of the nose and tail sections releasably couples to the integrated module to permit the actuation of the nose and tail sections as the mast is expanded to displace the nose and tail sections away from one another.

In accordance with a first aspect, the mast weight is less than 10%, preferably less than 5% and most preferably less than 1% of the total combined weight of the nose section, the tail section and the mast.

In accordance with a second aspect, the launch system further comprises aerodynamic surfaces located on either one or both of the nose and tail sections. The aerodynamic surfaces are configured such that the launch system, in its retracted state, is capable of effectuating a horizontal landing. The aerodynamic surfaces are configured only to support a load of the launch system for landing in its retracted state. The aerodynamic surfaces are incapable of supporting loads in addition to the load of the launch system in its retracted state.

In accordance with a third aspect, the nose and tail coupling surfaces each comprise complementary ones of a plurality of connecting pairs configured to structurally couple the nose and tail sections to one another or to structurally couple the nose and tail sections to opposing ends of a payload module, the payload module being released from the launch system after launch and before landing.

It is understood that the connecting pairs actuate between a locked or engaged state and a release state. The actuation of the connecting pairs may be controlled remotely or it may be controlled based on a number of parameters, such as, for example, altitude, location (e.g., GPS coordinates), time, etc.

In accordance with a fourth aspect, the launch system is in a first expanded state and the launch system further comprises one or a combination of a releasable payload module and a releasable fuel module structurally coupled to the nose and tail sections, the payload module and/or the fuel module each being configured to be released from the launch system after launch and before landing. The payload module may further comprise one or a plurality of plates or push rods actuated to push against the mast after the payload is released from the launch system.

The mast expansion may be controlled based on the actuation of the connecting pairs in the release state. Thus, upon release of the first set of connecting pairs, the mast may be expanded to a first distance in which either one of the nose and tail sections are dissociated from the payload module. Then, upon release of the second connecting pairs, the mast may be expanded to a second distance in which the other one of the nose and tail sections are dissociated from the payload module.

In accordance with a fifth aspect, the launch system further comprises one or more arms deployable from one or both of the nose and tail sections. The one or more arms comprises a plurality of pivoted sections and an end portion configured to releasably couple and manipulate one or both of the payload module and the fuel module structurally coupled to the nose and tail sections.

In accordance with a sixth aspect, the payload module comprises a plurality of subunits structurally coupled together by a plurality of connecting pairs.

In accordance with a seventh aspect, the payload module comprises a return capsule configured to return an item from orbit. The return capsule comprises an enclosed cavity to house the item, an access door, a heat-of-reentry shield, and orbital engines.

In accordance with a eighth aspect, the launch system further comprises at least one external fuel source. The at least one external fuel source is configured for release from the launch system after launch.

In accordance with an ninth aspect, the launch system further comprises one or a combination of solid-fuel rockets and/or liquid-fuel rockets releasably coupled to the launch system. The one or more solid-fuel rockets and/or liquid-fuel rockets are configured for release from the launch system after launch.

In accordance with a tenth aspect, the solid-fuel rockets and the liquid-fuel rockets each comprise front and aft sections and a mast coupling the front and aft section. The mast is configured to be actuated to a first expanded state to couple a fuel section between the front and aft sections, to a second expanded state to separate either one or both of the front and aft sections from the fuel section, and to a retracted state to couple the front and aft sections together after releasing the fuel section from the front and aft sections.

In accordance with an eleventh aspect, the nose and tail coupling surfaces comprise first and second circumferential flanges. The first circumferential flange comprises a plurality of pins configured to actuate between a radially deployed state and a radially retracted state and the second circumferential flange comprises a plurality of apertures configured to receive the plurality of pins in the deployed state to couple the nose and tail coupling surfaces. One of the first and second circumferential flanges overlaps the other one of the first and second circumferential flanges.

In accordance with an twelfth aspect, a payload module is provided having third and fourth flanges disposed at the opposing ends. The third and fourth flanges comprise one or the other of the plurality of pins or apertures to cooperate with one or the other of the first and second flanges of the nose and tail coupling surfaces, respectively.

In a second embodiment, a method for delivering a payload module to a remote location is provided. The method comprises providing the launch system, actuating the mast to a first elongated state in which the nose and tail sections are displaced at a distance that is greater than a length of a payload, positioning the payload between the nose and tail sections, and actuating the mast to a second elongated state in which the nose and tail coupling surfaces rigidly attach and engage the payload's forward and rearward facing surfaces, respectively. The mast in the second elongated state is understood to be shorter in length than in the first elongated state.

In accordance with a first aspect, the remote location is in orbit and wherein the launch system comprises orbital maneuvering engines.

In accordance with a second aspect, the remote location is not in orbit and the launch assembly comprises no engines or heat shields. Such a configuration for the launch assembly is appropriate where, for example, the remote location is in near space or the upper atmosphere.

In accordance with a third aspect, one or a combination of one or more solid-fuel rockets or one or more liquid-fuel rockets are coupled to the space launch system.

In a third embodiment, a multiple-stage rocket is provided. The multiple-stage comprises a first stage and a second stage releasably coupled to one another. The first stage comprises a fuel section and a return vehicle, the fuel section and return vehicle being releasably coupled to one another. The second stage comprises an orbiter and a payload module releasably coupled to one another.

The first and second stages are first decoupled before entering orbit and preferably, in the atmosphere or upper atmosphere. The decoupling may be initiated when the rocket reaches a predetermined altitude or location (e.g., GPS coordinate over the ocean) or when the fuel in the fuel section is depleted or nearly depleted. After the first and second stages are decoupled, the fuel section and the return vehicle are decoupled. The fuel section is permitted to fall to the earth under the force of gravity, preferably into the ocean, and the return vehicle deploys its landing gear assembly in preparation for ground landing. The second stage continues onto a desired release destination, either in orbit or in the upper atmosphere, for release of the payload module.

In accordance with a first aspect, the return vehicle comprises engines and control electronics.

In accordance with a second aspect, the return vehicle further comprises a connecting skirt configured to releasably couple the fuel section. The connecting skirt comprises a nose section having one or more access ports to accommodate fuel and other conduits to the return vehicle.

In accordance with a third aspect, the return vehicle further comprises aerodynamic surfaces and a landing gear assembly to permit the return vehicle to effectuate a horizontal landing.

In accordance with a fourth aspect, the orbiter comprises a nose section, a tail section and a mast coupling the nose and tail sections, the mast being configured to expand and retract to displace the nose and tail sections within a range of distances from one another. In a retracted state, the nose and tail sections are either structurally coupled to one another at the nose and tail coupling surfaces or structurally coupled to at least one module located between the nose and the tail sections. The nose and tail coupling surfaces each comprise complementary ones of a connecting pair configured to releasably couple the nose and tail sections to opposing ends of a payload module.

In a fourth embodiment, a method of delivering a payload to a release location in orbit using a multiple-stage rocket is provided. The method comprises launching the multiple-stage rocket, dissociating the first stage from the second stage and permitting the second stage to continue onto the release location in orbit, dissociating the fuel section and the return vehicle from one another, the return vehicle being configured to effectuate a horizontal landing at a desired return location, and dissociating the payload module from the orbiter at the release location in orbit.

In accordance with a first aspect, the method further comprises actuating the mast to the retracted state and effectuating a horizontal landing of the orbiter at a desired return location.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the inventions may be more readily understood by referring to the accompanying drawings in which:

FIGS. 23-28 are several views depicting the different configurations for the assembly of the orbiter and the solid-fuel and/or liquid-fuel rocket boosters.

Like numerals refer to like parts throughout the several views of the drawings.

DETAILED DESCRIPTION OF THE PREFERRED EMBODIMENTS

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Figure 1A:
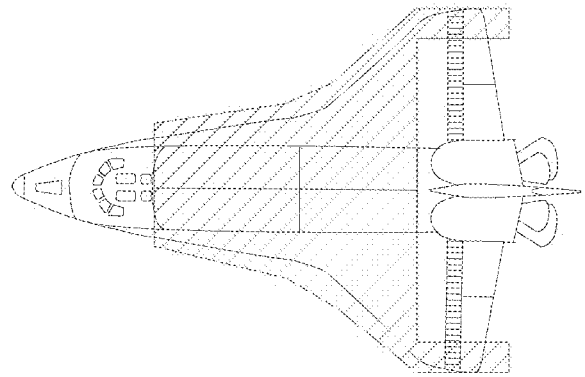
FIGS. 1A-1B are top and side views, respectively, of a prior art space shuttle.
Figure 1B:
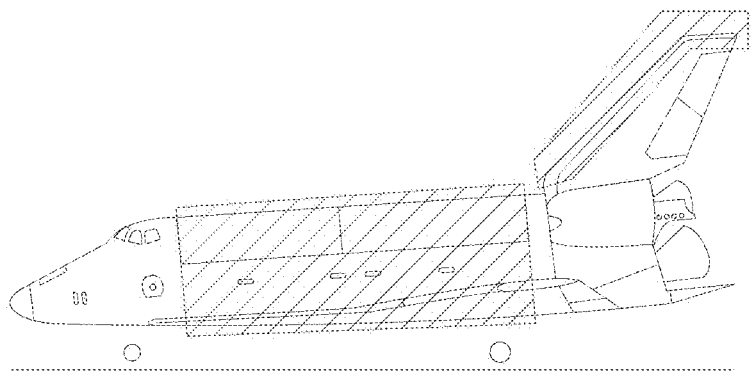

FIGS. 1A and 1B are top and side views, respectively, of a known space shuttle configuration that may be used to deliver a payload module into orbit. The space shuttle orbiter described herein is designed to eliminate a significant portion of the dead weight represented in the shaded portions of the space shuttle and also to provide a degree of adaptability of the orbiter structure based on the weight and size of a particular payload module. The shaded portions are dead weight in the operation of the shuttle in FIGS. 1A and 1B from launch to orbit since the wing span and aft structures (e.g., horizontal and vertical stabilizers and rudders) are only required to maneuver the shuttle when it re-enters the atmosphere from orbit to landing. Ideally, the space shuttle would be dynamically configurable such that it need not support a significant amount of dead weight during the various stages of its mission, from launch to landing.

FIGS. 2A-2E depict the sequence of steps associated with the dissociation of a payload module 104 that is structurally coupled to, and therefore integrated with, the nose 101 and tail 103 sections of the orbiter 100. The dissociation preferably takes place once the orbiter 100 reaches its desired release destination in orbit or in conditions of near zero gravity.

The orbiter 100 generally comprises a nose section 101, a tail section 103 and a mast 102 coupling the nose and tail sections 101, 103. The mast 102 is configured to actuate between multiple expanded configurations (FIGS. 2A-2E) and a retracted configuration (FIG. 2F) and the mast 102 cooperates with the nose and tail sections 101, 103, to couple and release a payload module 104. One or both of the nose and tail sections 101, 103 may further comprise rockets 914 peripherally disposed to assist in the maneuvering of the orbiter 100 once it reaches orbit. In addition, the payload module 104 may be made of multiple subunits (see FIGS. 12-13) which may be released at once or sequentially at different locations.

Figure 7A:
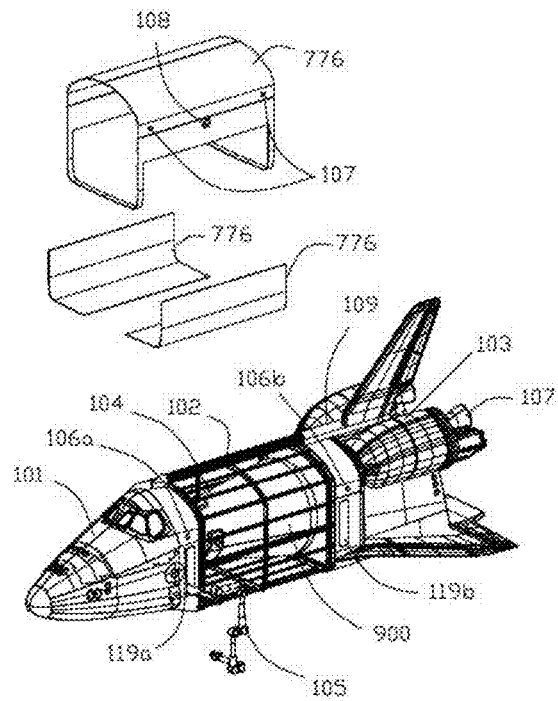
FIG. 7A is an exploded perspective view of the space shuttle orbiter with the payload module skin removed and the orbiter showing the return capsule housed within the structural frame of the payload module.
Figure 7B:
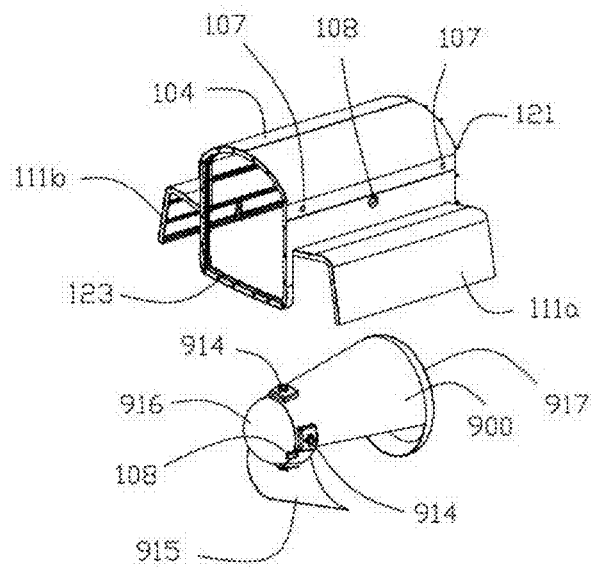
FIG. 7B is an exploded perspective view showing the payload module and the return module with their respective doors open in the same direction to permit access into the cavity of the return capsule when contained within the payload module.
Figure 12:
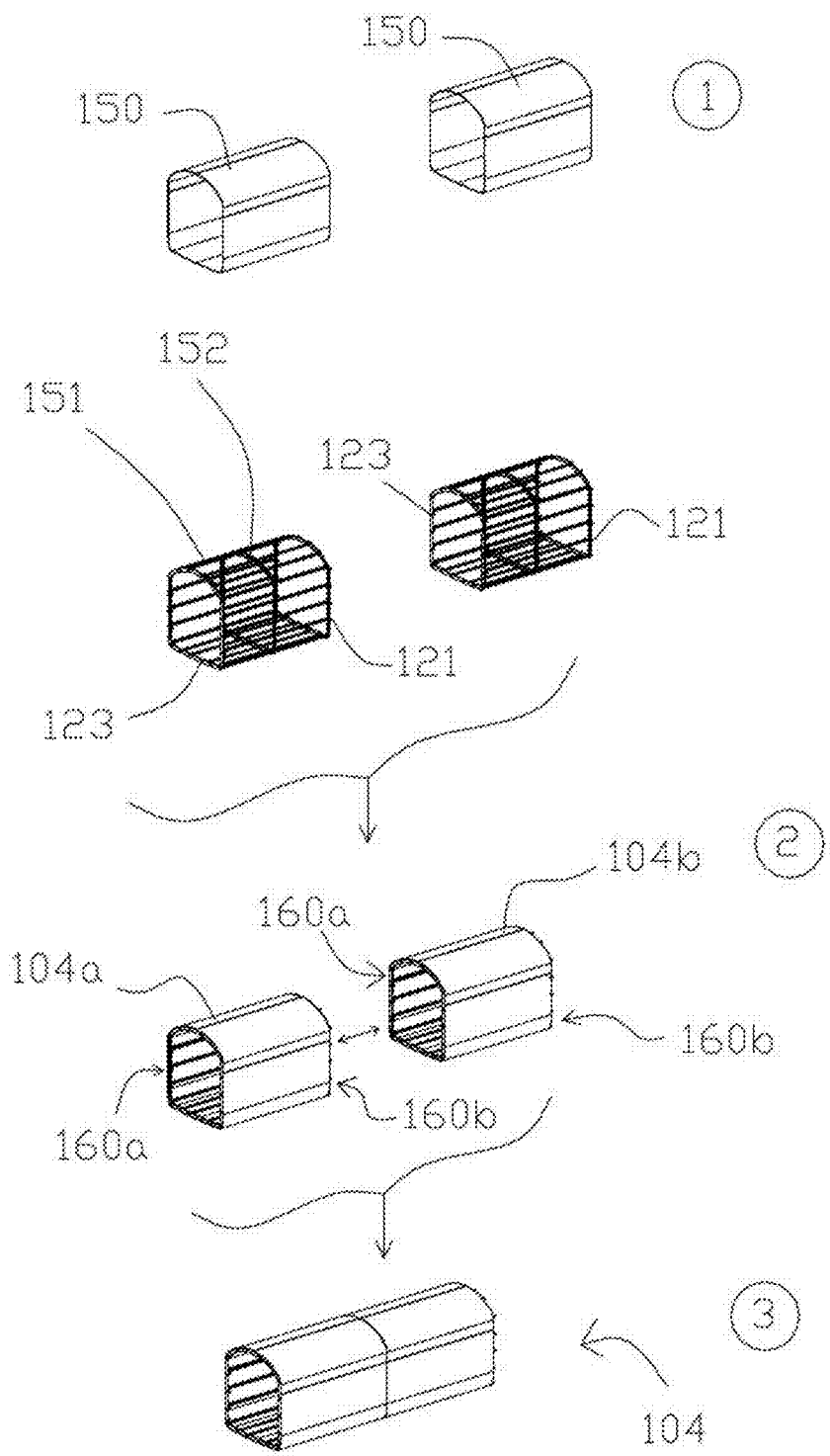
FIG. 12 illustrates the basic structure of a payload module comprising two subunits.

Generally, the mast 102 does not carry significant loads during launch or during extensive orbital maneuvers and the integrated structure, represented by the orbiter nose section 101, tail section 103 and payload module 104, supports the orbiter 100 load at launch. To that end, the payload module 104 is preferably made of a rigid structural frame, as shown in FIGS. 7A-B and 12, and the payload module 104 is structurally integrated, at both ends, with the nose and tail sections 101, 103. Examples of structural container modules are described in U.S. Pat. No. 7,261,257, issued on Aug. 28, 2007, and U.S. Pub. No. 2010/0276538, published on Nov. 4, 2010, the entire contents of which are incorporated herein by reference in their entireties. Integrating the payload module 104 to the nose and tail sections 101, 103 provides the structural rigidity to the orbiter 100 needed to support it from launch to orbit.

Because the mast 102 is relieved of the structural requirements to support the loads imposed by the nose and tail sections 101, 103 and payload module 104 under full gravity, the mast 102 may be constructed of lightweight materials and may be rigid or semi-rigid. The cross-section of the mast 102 may be tailored to loads that it will encounter. The mast 102 is designed to carry out two main functions when the orbiter 100 is in near zero gravity conditions: (1) to expand and retract the nose section 101 and the tail section 103 relative to one another and (2) to control and maintain the relative orientation of the nose and tail sections 101, 103 when the payload module 104 is not coupled to the orbiter 100 so that the nose and tail sections 101, 103 are maintained in proper alignment to mate and couple with one another. Because these functions are carried out in orbit or near zero gravity conditions, there are fewer forces acting upon the mast 102. Thus, the mast 102 may be made significantly smaller and of a significantly lighter weight structure than would be needed if the mast 102 were required to perform these functions in the presence of full gravity.

In a preferred embodiment, the mast 102 represents less than 10% of the total weight of the orbiter 100 (e.g., the nose section 101, the tail section 103 and the mast 102) without the payload module 104 and, more preferably, less than 5% of weight of the orbiter 100 without the payload module and, most preferably, less than 1% of the total weight of the orbiter without the payload module 104. In a particularly preferred embodiment, the mast 102 represents less than 0.05% of the total weight of the orbiter 100 without the payload module 104, more preferably less than 0.01% of the total weight of the orbiter 100. It is understood that while the orbiter 100 is depicted herein as comprising a single mast 102, it is understood that the orbiter 100 may comprise a plurality of masts 102, in which case the relative weight percentages of the plurality of masts 102 as compared to the orbiter 100 without the payload module 104 is proportionally increased.

In accordance with one embodiment, the mast 102 may comprise telescoping segments which expand and retract by nesting within one another. In accordance with another embodiment, the mast 102 may comprise a plurality of identical and interconnected modules extended along a central axis when the mast 102 is deployed. Each module comprises non-folding station rods jointed to form a rigid station and non-folding longerons each hingedly connected to a corner of the station. Four diagonal segments may be formed as part of two flexible inelastic cables, which are brought together at a control which permits the elongation and collapsing of the adjacent segments. U.S. Pat. No. 5,267,424, entitled "Module for an Articulated Stowable and Deployable Mast", issued Dec. 7, 1993 describes embodiments of mast structures suitable for use in connection with the space shuttle orbiter 100, the contents of which are incorporated herein by reference in its entirety as if fully set forth herein. The mast 102 may take on any number of other suitable configurations, including a triangular lattice structure described in U.S. Pat. No. 5,154,027, entitled "Deployable/Retractable Mast Independently Rotatable When Deployed", issued Oct. 13, 1992, the contents of which are incorporated herein by reference in its entirety as if fully set forth herein.

While the Figures depict the orbiter 100 as comprising only a single mast 102, it is understood that the orbiter may comprise a plurality of masts that connect the nose and tail sections 101, 103, together. A plurality of masts may be desirable where the orbiter 100 is expected to carry larger payloads or is expected to experience higher inertial forces, such as releasing items in the upper atmosphere or for robust military maneuvers. Once the payload module 104 is dissociated from the orbiter 100, one or more of the plurality of masts may be dissociated, leaving at least one mast to couple and retract the nose and tail section 101, 103 together.

The mast 102 may optionally comprise conduits for communications and/or for transferring power and/or fuel between the nose 101 and tail 103 sections. A fairing 120 is optionally provided to cover and protect the expanded mast 102 during launch and to improve the aerodynamic performance of the orbiter 100. The fairing 120 may be retracted within the orbiter's nose or tail sections 101, 103 or it may be completely dissociated and discarded from the orbiter 100 when it reaches orbit or the upper atmosphere.

Figure 2A:
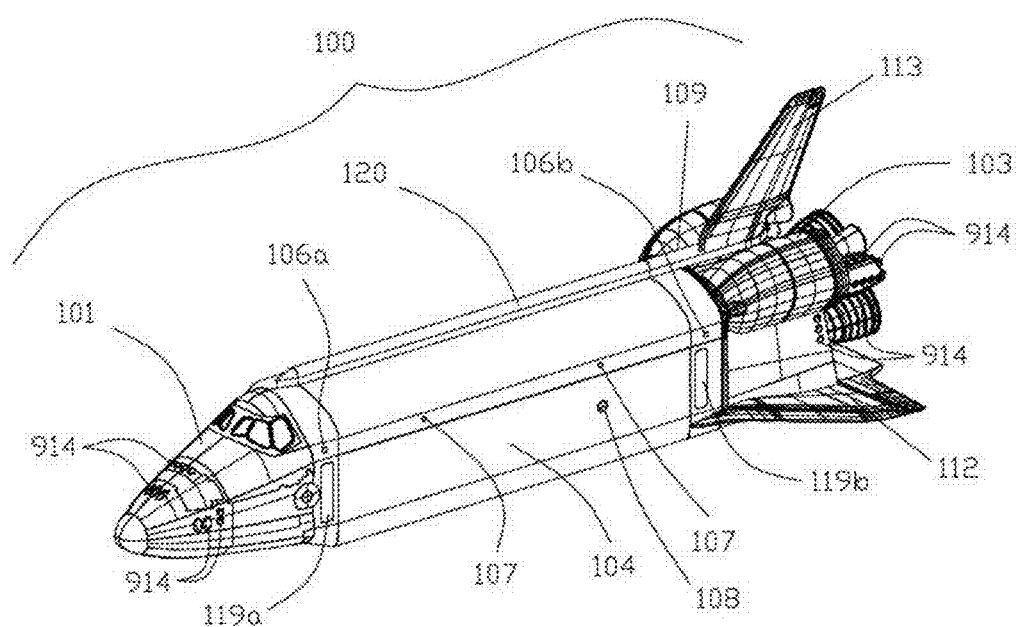
FIGS. 2A-2F depict the sequence of steps associated with the dissociation of a space shuttle orbiter and a payload module.
Figure 4:
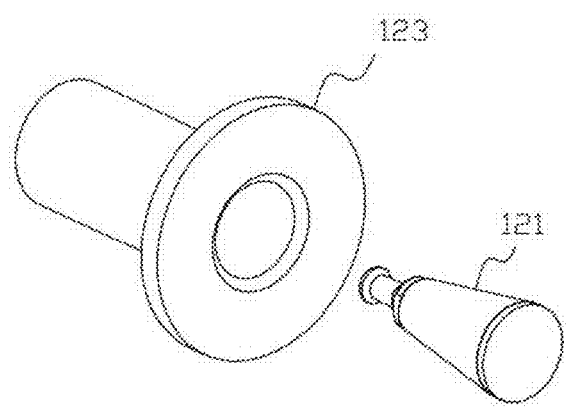
FIG. 4 is a perspective view showing an embodiment of a female and male connecting pair.
Figure 5:
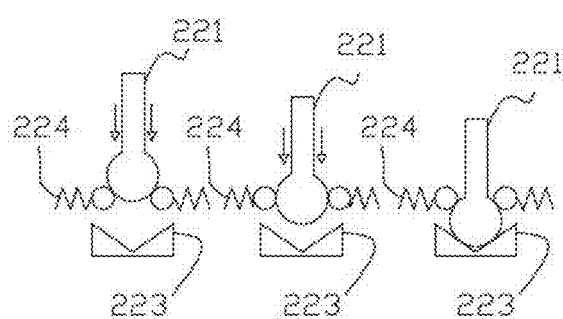
FIG. 5 is a schematic diagram showing the engagement of the connecting pair.

FIG. 2A depicts an embodiment of the orbiter 100 in its configuration from launch to orbit, in which the mast 102 (not shown) is protected within a removable or retractable fairing 120 and the payload module 104 is rigidly and structurally integrated with the nose and tail sections 101, 103. In the preferred embodiment depicted in FIGS. 2A-2E, the nose and tail sections 101, 103 comprise bulkheads and/or structural rings comprising complementary ones of a connecting pair 121, 123. In one embodiment, a first set of connecting pairs 121 may be disposed about the peripheral portion of the front bulkhead or coupling surface on the nose section 101 and a second set of connecting pairs 123, complementary to the first set 121, may be disposed on the rear bulkhead coupling surface of the tail section 103. Exemplary connecting pairs are depicted in FIGS. 4 and 5 as comprising corresponding male and female connectors 221, 223. As further illustrated in FIG. 5, the female connector 223 may comprise additional mechanisms known in the art to receive, lock and release the male connector 221. The mechanism may be remotely and selectively actuated between an engage and release state. As illustrated in FIG. 5, the female connector 223 may comprise an actuated means 224 to engage the male connector 221. Some of the male connectors 121 may be longer than others to help in pre-alignment and/or release of the system whereby the female connectors 123 may have additional push actuators that may act on the longer male connectors 121 to assist in dissociating them from the female connector 123.

Figure 33:
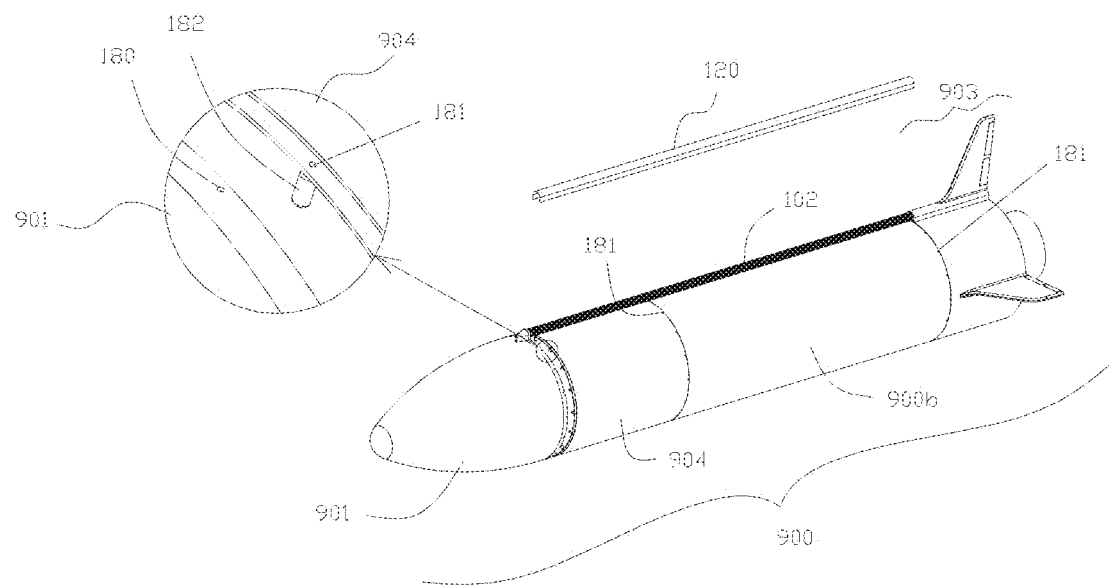
FIG. 33 depicts another embodiment of an upper stage of a two-stage rocket in which the front section, the payload, the fuel section and the aft section are coupled together using an axially actuated pin connection system.

Alternatively, the nose section 101, the tail section 103 and the payload module 104 may cooperate and be coupled in the manner as depicted and described in relation to FIG. 33.

Figure 2B:
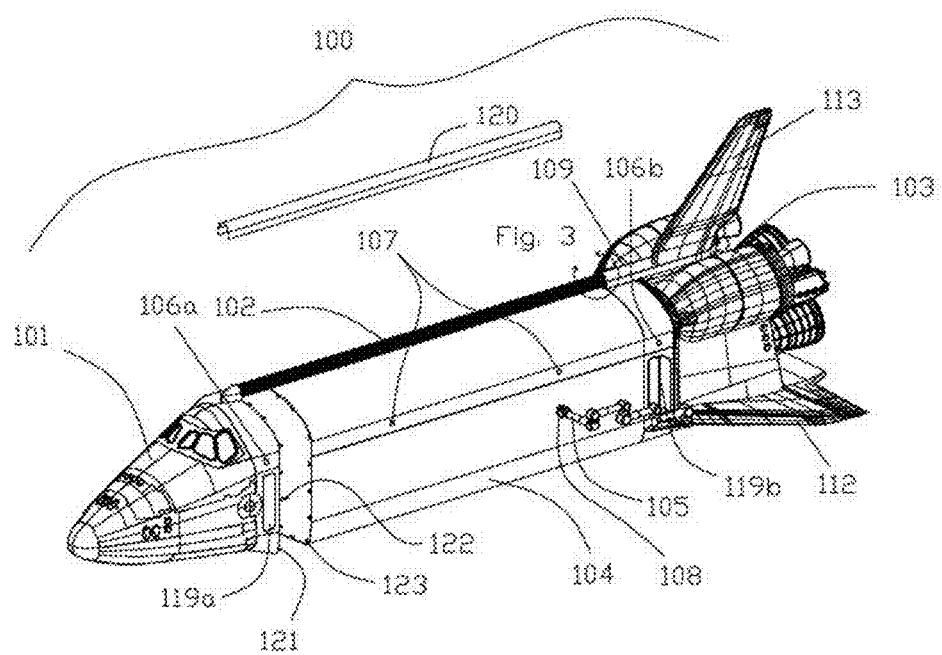

FIG. 2B depicts the orbiter 100 initiating a sequence of events prior to the release of the payload module 104. The payload module 104 is released when it reaches its release destination in orbit. Once the payload module 104 is released, it may continue on to its destination under its own thrust with the aid of orbital rockets 914 optionally provided on the payload module 104.

As illustrated in FIG. 2B, the initiating of payload release begins with the dissociation or retraction of the fairing 120 from the mast 102. The connecting pairs 121, 123 coupling the nose section 101 and payload module 104 is then released from engagement from one another as the female connectors 123 actuate from the engaged state to the release state. Mast 102 then expands to a first elongated state to separate the nose section 101 from the forward facing surface of the payload module 104 and to completely release the engagement between the respective connecting pairs 121, 123. The decoupled connecting pairs 121, 123 are depicted in which the male connector 121 protrudes along the periphery of the nose section 101 and the female connector 123 is disposed along the periphery of the forward facing surface of the payload module 104.

The payload module 104 is stabilized notwithstanding the dissociation of the connecting pairs 121, 123 between the nose section 101 and the payload module 104 either by maintaining the coupling between the nose section 101 and payload module 104 via elongated male connector 122 or via mechanical arm 105 at attach point 108 disposed on the payload module 104 (FIG. 2B). Thus, in FIG. 2B, connecting pairs 121, 123 coupling the nose section 101 and the forward facing surface of the payload module 104 are disengaged and then the mast 102 is elongates to a first elongated state to provide a distance between the nose section 101 and the payload module 104.

Figure 2C:
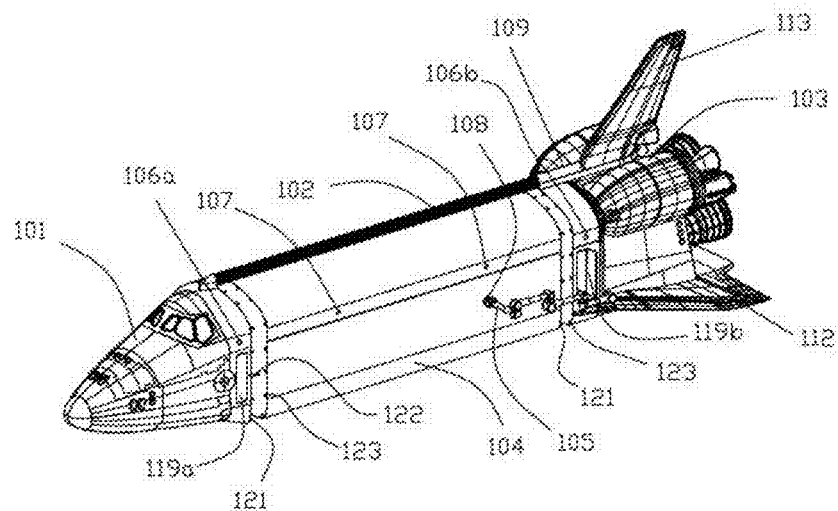

FIG. 2C depicts the orbiter 100 in which the mast 102 is elongated to a second elongated state to disengage the payload module 104 from the tail section 103. As shown in FIG. 2C, the payload module's rearward facing surface comprises a plurality of male connectors 121 and the rear bulkhead coupling surface of the tail section 103 comprises a plurality of corresponding female connectors 123, which actuate from the engaged state to the release state before mast 102 further elongates to the second elongated state to disengage the payload module 104 from the tail section 103. Because either the nose section 101 remains coupled to the payload module 104 via elongated male connector 122 or the tail section 103 remains coupled to the payload via mechanical arm 105 (FIG. 2C), the payload module 104 may be pulled apart in the forward direction and away from the tail section 103 during the process of mast elongation to the second elongated state.

The mechanical arm 105 is preferably deployed from either one or both of a nose section 101 and a tail section 103 via enclosed cavities 119a, 119b disposed respectively therein. In a particularly preferred embodiment, the mechanical arm 105 is deployed from the tail section 103 and couples to an arm attach point 108 to provide a stable connection between the tail section 103 and the payload module 104 and to control the position and movement of the payload module 104 after dissociation of the two sets of coupling pairs (nose and tail sections).

The mechanical arm 105 comprises a plurality of pivoting sections to provide a wide range of movement in the x-y-z planes and thus to permit control over the payload module 104 after its release from the nose and tail sections 101, 103 without imparting undue loads on the mast 102. The mechanical arm 105 is preferably coupled to the payload module 104 via an arm attach point 108 disposed on the surface of the payload module 104 either before, simultaneously with or after the dissociation of the payload module 104 from the nose and tail sections 101, 103.

In a preferred embodiment, the mechanical arm 105 attaches to the payload module 104 just prior to complete dissociation of the payload module 104 from the nose and tail sections 101, 103. In addition to assisting in the displacement of the disengaged payload module 104 away from the orbiter 100, the manipulator arm 105 may also be used to attach to and retrieve an item and to position it for attachment and engagement with the nose and tail sections 101, 103. In other examples, the manipulator arm may be attached to the mast and in some cases, be able to move along the mast. Examples of such an arrangement are described in U.S. Pat. No. 4,772,175, entitled "Space Station Erectable Manipulator Placement System", issued Sep. 20, 1988 and U.S. Pat. No. 4,738,583, entitled "Space Spider Crane", the contents of which are incorporated herein by reference in their entirety as if fully set forth herein. In the cases of these embodiments, the manipulator and/or crane may be housed within the tail section of the orbiter 103. It is understood that in cases where the mast has additional loads to contend with, then it would be designed to handle those additional loads as well.

Figure 2D:
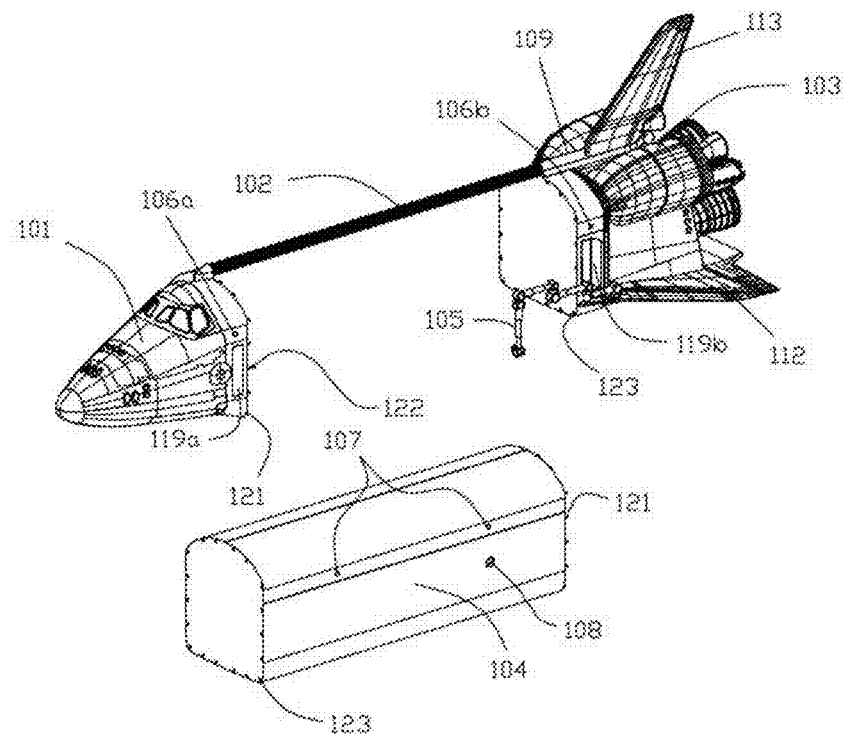
Figure 34:
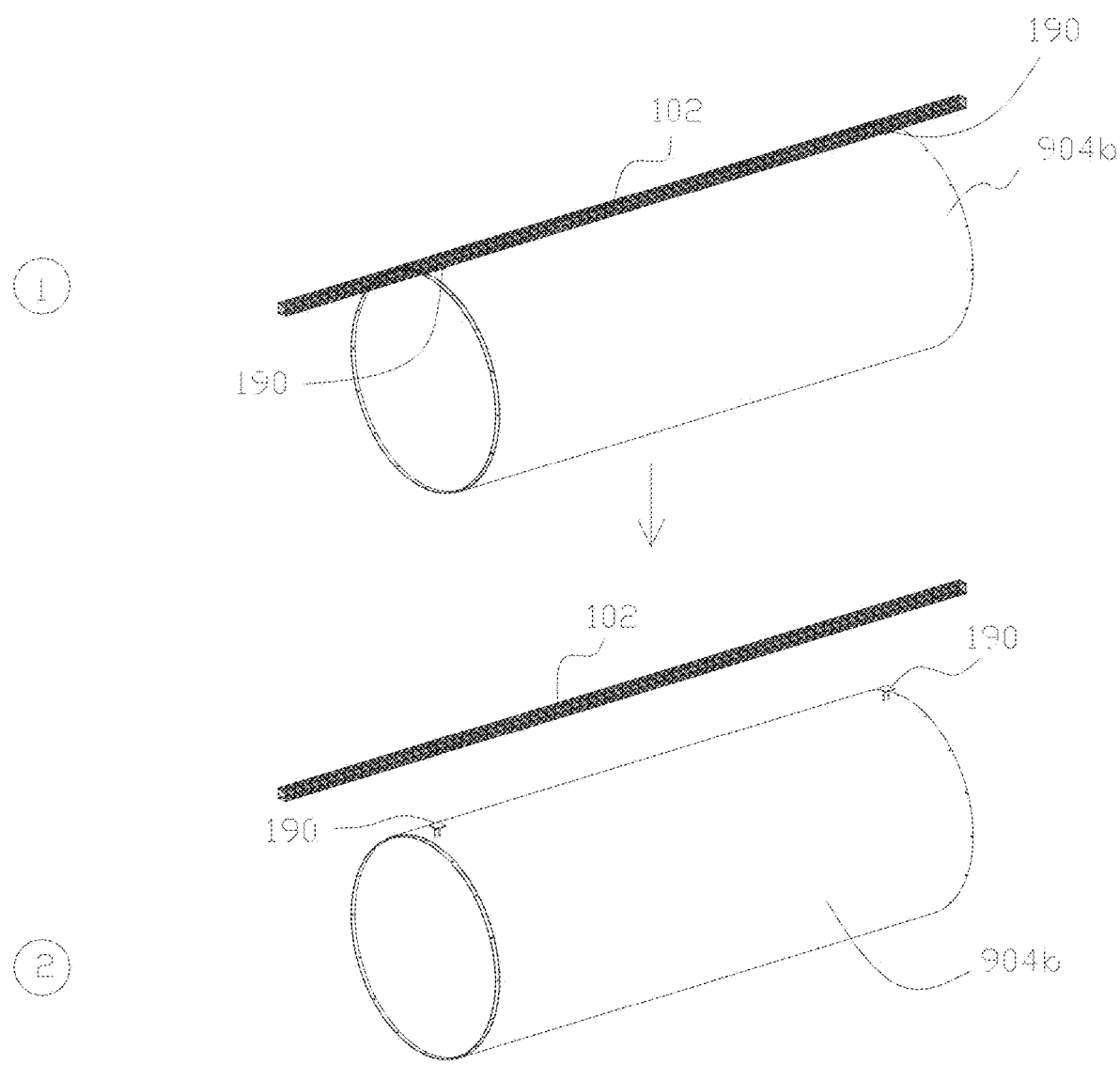
FIG. 34 illustrates another means by which a dissociated payload module may be pushed away from the mast.

Alternatively, the payload 104 may comprise one or a plurality of actuated plates or push rods 190 as depicted in FIG. 34 to displace the payload 104 away from the orbiter 100 after dissociation FIG. 2D depicts the complete dissociation between the orbiter 100 and the payload module 104. Once the payload module 104 is completely dissociated from the nose and tail sections 101, 103, the mechanical arm 105 may pivotally displace and guide the payload module 104 a safe distance away from the orbiter 100 before completely releasing it. This provides a safeguard against the payload module 104 colliding with or otherwise damaging the orbiter 100 during release.

While FIGS. 2B-2D depict the mechanical arm 105 in a cavity 119b disposed on the side of the tail section 103, it is understood that the location of the mechanical arm 105 is not so limited. The mechanical arm 105 may also be disposed in a cavity 119a disposed on one or both sides of the nose section 101 or on the upper or lower surfaces (not depicted) of the nose section 101. A mechanical arm may further be provided to extend out of the rearward or forward facing surfaces of the nose and tail sections 101, 103, respectively.

Figure 2E:
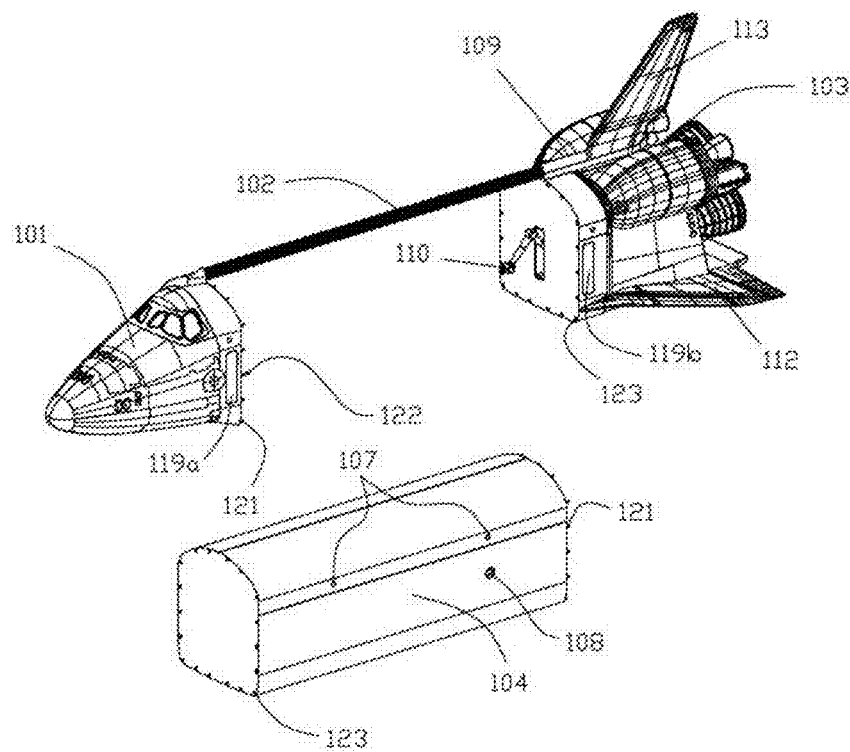

FIG. 2E depicts an alternative embodiment in which a mechanical arm 110 may also be located to access out of the forward facing surface of the tail section 103. This mechanical arm 110 may be provided in place of, or in addition to, the mechanical arm 105 that is located to access out of the respective cavities 119a, 119b of the nose and tail sections 101, 103. Either one or all of the mechanical arms 105, 110 may cooperate to move and position a payload module 104 for release or for engagement with the orbiter nose and tail sections 101, 103.

Figure 2F:
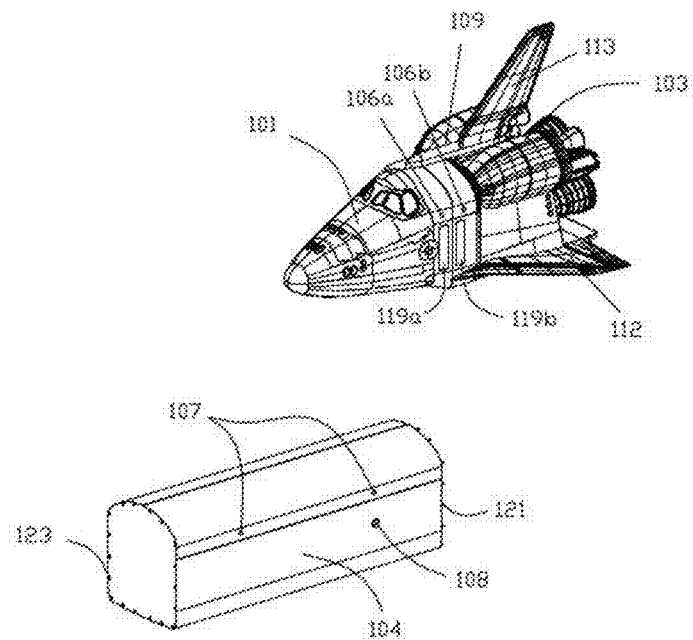
Figure 3:
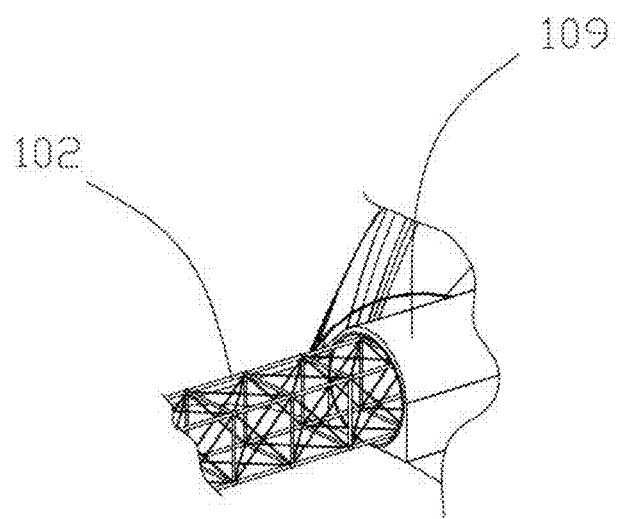
FIG. 3 is a cut-away perspective view showing the mast and its associated canister.

FIG. 2F depicts the orbiter 100 in its fully retracted state, ready to de-orbit and return to earth for landing. After the payload module 104 is completely dissociated from the orbiter 100 and the mechanical arms 105, 110 are detached from the payload 104 and retracted into their respective cavities 119a, 119b of the nose and tail sections 101, 103, the mast 102 actuates the nose and tail sections 101, 103 into a retracted state. During the retraction, the mast 102 is collapsed or telescoped into a compact configuration within a canister 109 disposed on the tail section 103. It is understood that the canister 109 may just as well be provided on the nose section 101. The nose and tail sections 101, 103 comprise ones of complementary connecting pairs 121, 123 and thus may structurally couple and integrate with one another to form a compact orbiter 100 that may exit orbit and return to earth. The mast 102 and canister 109 is depicted in greater detail in FIG. 3.

Because the orbiter 100 takes on a significantly reduced configuration after dissociating from the payload 104, the orbiter 100 may be equipped with significantly reduced air control surfaces structure and thus much less weight as compared with the space shuttle depicted in FIGS. 1A and 1B. The aerodynamic surfaces, such as the wing span and aft structures (e.g., horizontal and vertical stabilizers and rudders) are required only to support the orbiter 100 on its return path, from when it re-enters the atmosphere from orbit to landing. The aerodynamic surfaces are not required to support the orbiter 100 and its associated payload 104 from launch to orbit or while the orbiter 100 is in orbit. Moreover, the wing span and aft structures are required only to support the loads imposed by the orbiter 100 in its fully retracted state and not the loads imposed by the removable payload module 104. Thus, because the orbiter 100 dissociates from its payload and takes on a retracted configuration prior to undertaking its return path, the orbiter 100 requires only sufficient structure to support it in this retracted configuration and therefore has a significantly smaller wing and aft structure as compared to the space shuttle in FIGS. 1A and 1B, which maintains the same structural configuration and design from launch to landing.

In one preferred embodiment, as depicted in FIGS. 2A-2F, the orbiter 100 comprises a pair of horizontal stabilizers 112 disposed from opposing sides of the tail section 103 and a vertical stabilizer 113 disposed from the top side of the tail section 103. The horizontal and vertical stabilizers 112, 113 are configured and dimensioned to support the orbiter 100 in its return path from after it enters the atmosphere to landing only in its retracted configuration (FIG. 2F) and not in its expanded configuration, including the affixed payload module 104 (FIG. 2A). As can be seen, the horizontal 112 and vertical stabilizers 113 are significantly smaller than the wings and aft structure represented in the shuttle of FIGS. 1A-1B. It is understood that the aerodynamic surfaces represented by the horizontal 112 and vertical 113 stabilizers are one of a number of different suitable configurations. It is understood that the aerodynamic surfaces may also be canted or deployable from the nose 101 or tail 103 sections just prior to re-entering the atmosphere.

As previously indicated, the payload module 104 is preferably constructed of structural frames and skins and may consist of a plurality of integrated subunits. While FIGS. 2A-2E depict the payload module 104 as a single unit, it is understood that the payload module 104 may comprise a plurality of interconnected subunits to provide greater flexibility. The payload module 104 may be provided in a variety of configurations as described in co-pending U.S. patent application, Pub. No. 2010/0276538, published on Nov. 4, 2010, the entire contents of which are incorporated herein by reference as if fully set forth herein.

FIG. 12 illustrates the basic structure of a payload module 104 that is comprised of two subunits 104a, 104b. Each of the subunits 104a, 104b is constructed of a structural frame, comprising interconnected longerons 151 and ribs 152, and an outer skin 150. The forward and rearward facing surfaces 160a, 160b each comprise ones of a complementary connecting pair 121, 123 disposed peripherally about the surfaces. The connecting pairs 121, 123 permit the coupling of the subunits 104a, 104b to have a structural engagement with one another to produce a single integrated payload module 104 that is ready for structural engagement with an orbiter 100.

The ability to configure a single payload module 104 from a plurality of integrated subunits 104a, 104b permit the payload module 104 to be adaptable and configurable based on the items and/or payloads that may be carried.

Figure 13:
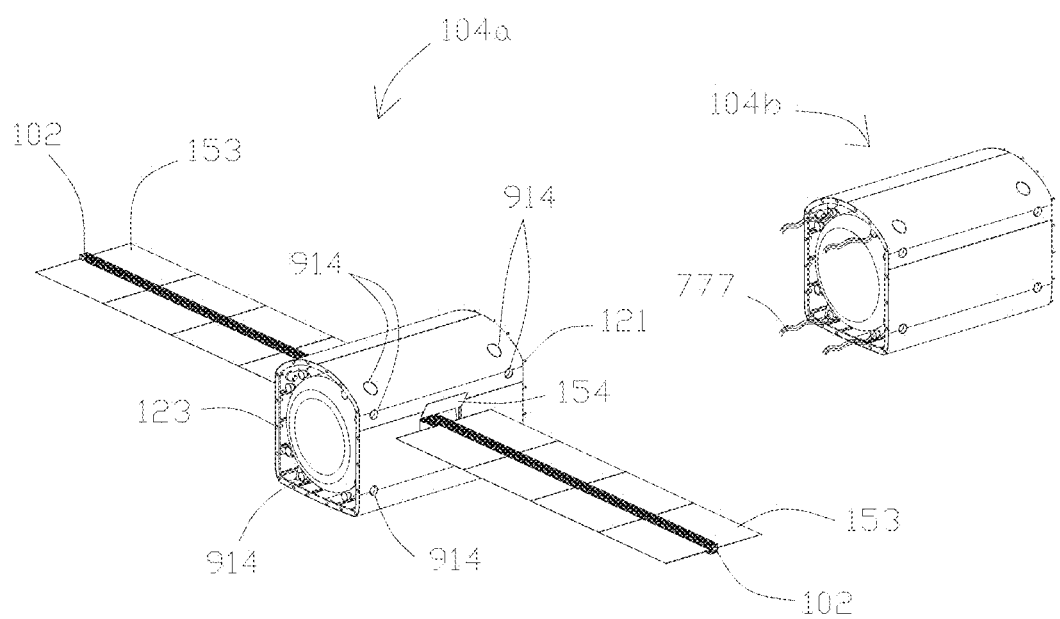
FIG. 13 depicts the individual payload subunits as each comprising a satellite system that may be deployed in orbit after the payload module is dissociated from the orbiter and the individual subunits are dissociated from one another.

FIG. 13 depicts the individual subunits 104a, 104b as comprising a satellite system assembly that may be deployed in orbit after the payload module 104 is dissociated from the orbiter 100 and the individual subunits 104a, 104b are dissociated from one another. Each of the subunits 104a, 104b houses a satellite system 153 coupled to an extendable mast 102. The satellite system 153 may be deployed as the mast 102 is elongated out of the access doors 154 of the subunit 104a. It is also understood that the payload module 104a, 104b may preferably comprise its own in-orbit maneuvering capability via orbital engines 914 disposed peripherally of the payload module 104a, 104b as well as front and aft. The thrust 777 generated from the orbital engines 914 propels the payload module 104a, 104b to a desired location. It is understood that the individual payload subunits 104a, 104b may be released at the same time or sequentially. In the sequential release, one of the individual payload subunits 104a, 104b may first be released and the mast 102 may retract following the first release to couple the remaining one of the individual payload subunits 104a, 104b to the nose and tail sections 101, 103 of the orbiter. The remaining one of the individual payload subunits 104a, 104b may subsequently be released at another location by expansion of the mast 102 and decoupling of the remaining payload subunit 104a, 104b. The dissociation of the individual payload subunits 104a, 104b is performed much in the same manner as described in relation to FIGS. 2A-2F.

The space orbiter 100 has generally been described as delivering a payload from the launch site to a desired location in orbit. The orbiter 100, however, may also facilitate in the retrieval and return of certain items or payloads from orbit for delivery to another location, typically earth but may be to other orbits or locations.

Figure 8:
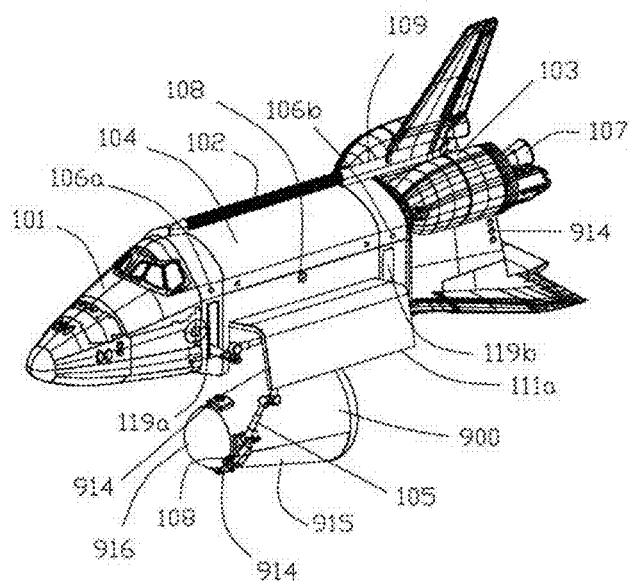
FIG. 8 is a perspective view showing a manipulator arm either removing or placing the return capsule from the payload module.

FIGS. 7A-7B and 8 depict an orbiter 100 in which the payload module 104 comprises a return module 900 that is configured to transport an item or payload retrieved from orbit to earth. The return module 900 comprises an access door 915, which opens to receive the target payload for transport, a plurality of in orbit attitude control and de-orbiting engines 914 to maneuver the return module 900 in space and to de-orbit, and a nose section 916 from which parachutes may deploy upon reaching a predetermined altitude. The return module 900 further comprises an arm attach point 108 to permit attachment by a mechanical arm 105, 110 disposed from the orbiter 100.

The return module 900 is secured within the payload module 104 and may be accessed by opening the access panels 111a, 111b of the payload module 104. FIG. 7A depicts the return module 900 contained within the payload module 104 with the skin 776 shown removed and the orbiter showing the return capsule housed within the structural frame of the payload module 104.

In a preferred embodiment, the return module 900 remains within the payload module 104 that is integrated with the orbiter 100 as manipulator arms 105 from the orbiter 100 retrieve an item or payload in orbit and place it inside the return module 900. It is understood that during this operation, both the access panels 111a, 111b of the payload module 104 and the access door 915 of the return capsule 900 both open in the same direction to permit access to the return capsule cavity. The return module 900 may be released from the payload module 104 once the desired items or payload is placed within it.

FIG. 8 depicts the removal of the return module 900 by the mechanical arm 105 at the arm attach point 108 disposed on the side of the return module 900. Once the return module 900 is removed from the payload module 104, the mechanical arm 105 releases it to permit its return journey to earth by first de-orbiting via engines 914 and then by deploying parachutes from the nose section 916 upon re-entry into the atmosphere. A heat shield 917 may be provided to protect the return module 900 upon atmospheric entry. Alternatively, the return module 900 may remain coupled with the orbiter 100 via the mechanical arm 105 when the orbiter 100 is in its retracted state. This coupling may be maintained until just prior to entering the atmosphere so as to obviate the need for the return module 900 to have deorbiting engines 914.

FIGS. 6A-6F illustrate exemplary apparatuses and a method for assembling and engaging the payload module 104 onto the space shuttle orbiter 100 on the ground and prior to launch using an orbiter clamp 1000 and a payload module clamp 2000. Because the assembly is performed on the ground, the orbiter clamp 1000 and payload module clamp 2000 are necessary to take on the load of the nose and tail sections 101, 103 and to prevent or to substantially reduce the load from being transferred or imposed onto the mast 102. As previously explained, the mast 102, being constructed of lightweight materials, has only sufficient structure and rigidity to withstand the inertial forces imposed upon it by the nose and tail sections 101, 103 in near zero gravity conditions. Thus, the mast 102 has insufficient structure and rigidity to support any loads by the nose and tail sections 101, 103 in full gravity conditions.

Figure 6A:
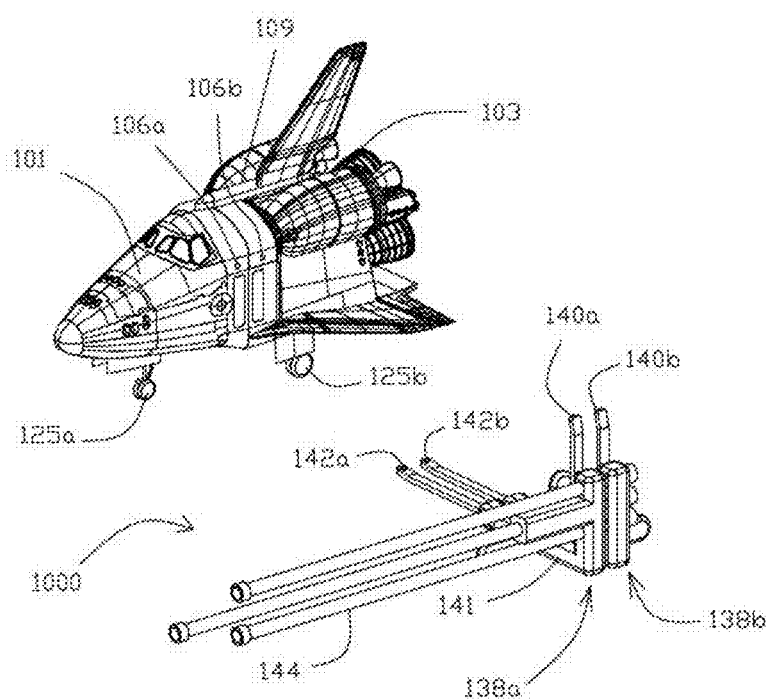
FIGS. 6A-6F illustrate exemplary apparatuses and a method for assembling and engaging the payload module onto the space shuttle orbiter on the ground and prior to launch using an orbiter clamp and a payload module clamp.

FIG. 6A depicts the orbiter 100 in a retracted configuration in which the nose 101 and tail 103 sections are coupled together via connecting pairs and the forward and rear landing gears 125a, 125b deployed and support the orbiter 100 on a ground surface.

Figure 6B:
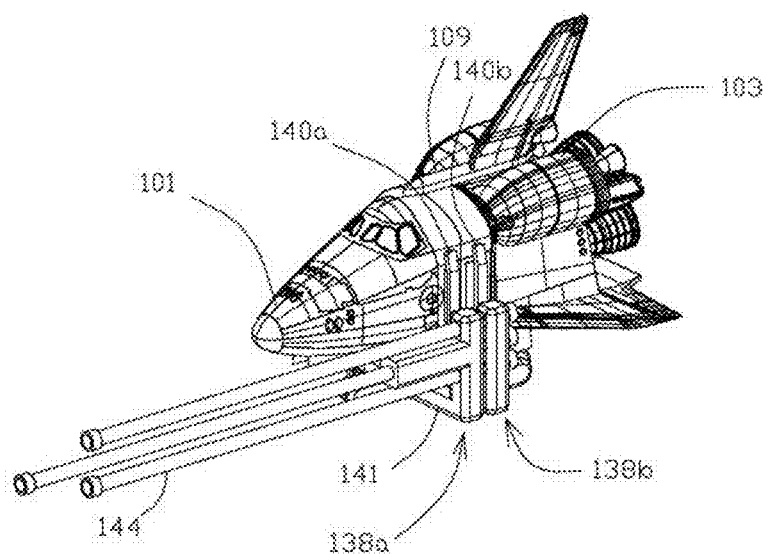
Figure 6C:
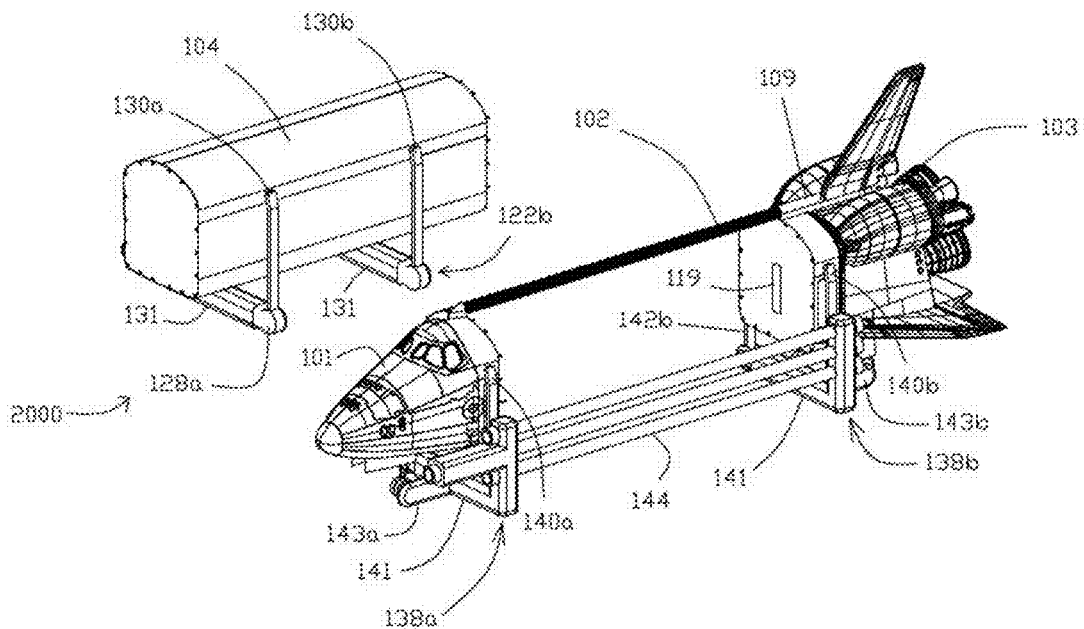
Figure 6D:
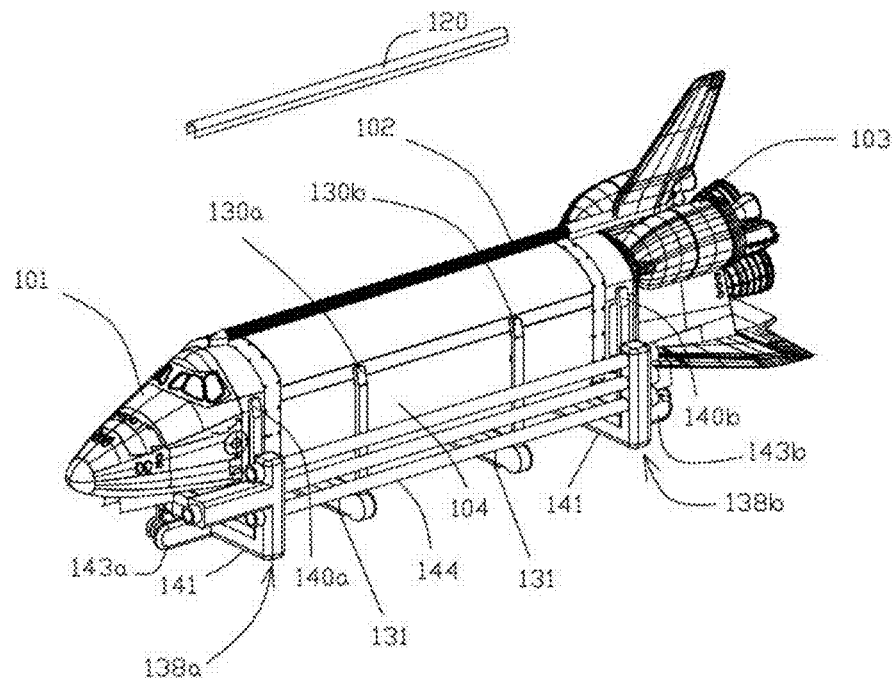

An orbiter clamp 1000 is provided to support the load of the orbiter 100 and to control the moments and rotations of the nose and tail sections 101, 103 and thus to prevent or at least reduce the load from these sections from being transferred onto the mast 102, particularly as the orbiter clamp 1000 actuates the orbiter 100 from the retracted state (FIGS. 6A-6B) to the expanded state (FIGS. 6C-6D). As previously discussed, the mast 102 is preferably constructed of lightweight materials and thus has insufficient strength or rigidity to support the weight or the load of the nose 101 and tail 103 sections.

The orbiter clamp 1000 comprises a forward clamp 138a, a rearward clamp 138b and a plurality of guide rails 144. Either one or both of the forward clamps 138a and the rearward clamps 138b may be slidably disposed along the guide rails 144 such that the distance between them may be adjustably provided. This adjustability permits the coupling of payload modules 104 of various lengths. Each one of the forward and rearward clamps 138a, 138b comprises a pair of clamping arms 140, 142 and a cross bar 141 therebetween and coupling the clamping arms 140, 142. The clamping arms 140, 142 are configured to fixedly attach to side wall attachments 106a, 106b on opposing sides of the orbiter 100.

The forward and rearward cross bars 141 are configured to attach to and slidably support the forward and rearward landing gears 125a, 125b, respectively. The mechanism that drives the mast 102, internally of the canister 109, between expanded and retracted configurations, is set to a neutral or slave mode to permit actuation of the mast 102 externally via the orbiter clamp 1000.

In a preferred embodiment, the forward and rearward clamps 138a, 138b each couple the nose and tail sections 101, 103, respectively, in at least three points of contact. To that end, one pair of clamping arms 140a, 140b is provided in a fixed upright portion and configured to affix to the side wall attachments 106a, 106b on one side of the orbiter. Another pair of clamping arms 142a, 142b is provided and are pivotable between an open loading position (FIG. 6A) and an upright position in which the clamping arms 142a, 142b are pivoted approximately 90 degrees relative to the cross bars 141 and affixed to the side wall attachments 106a, 106b of the orbiter 100 on the other side of the orbiter 100 affixed to the fixed clamping arms 140a, 140b. The open loading position (FIG. 6A) permits the relative positioning and alignment between the orbiter 100 the clamping arm pairs 138a, 138b. Once the orbiter 100 and the clamp 1000 is appropriately positioned, the orbiter 100 is affixed to the fixed clamping arms 140a, 140b and then affixed to the pivotable clamping arms 142a, 142b. The forward and landing gears 125a, 125b are also coupled to attach points 143 provided on the forward and rearward cross bars 141.

FIG. 6B depicts the orbiter 100 in which the clamping arms 140a, 142a are attached to the nose section 101 at the side wall attachments 106a on opposing sides of the orbiter 100 and the forward cross bar 141 is coupled to the strut or other connecting point of the forward landing gear 125a to provide three points of attachment. Similarly, the rearward clamping arms 142a, 142b are attached to the tail section 103 at the opposing side wall attachments 106b and rearward cross bar 141 couples the struts of the at least one or of the two rearward landing gear 125b to provide three or more points of attachment.

Once the nose and tail sections 101, 103 are coupled to the forward and rearward clamps 138a, 138b, respectively, the nose section 101 is slidably displaced to a first distance away from the tail section such that the orbiter is in an expanded state, as illustrated in FIG. 6C. This first distance is preferably greater than the length of the payload module 104 so as to provide ease of positioning of the payload module 104 between the nose and tail sections 101, 103.

The payload module 104 is moveably positioned between the nose and tail sections 101, 103 by a payload module clamp 2000 for engagement with the orbiter 100 (FIG. 6D). In one preferred embodiment, the payload module clamp 2000 comprises forward and rearward clamping arms 128a, 128b. Each one of the forward and rearward clamping arms 128a, 128b comprise one of a pivotable clamping arm 130a, 130b and one of a fixed clamping arm 132a, 132b configured to couple attach points 107 disposed on both sides of the payload module 104. Cross bars 131 are disposed between the pivotable clamping arms 130a, 130b and the fixed clamping arms 132a, 132b on the opposing side. The cross bars 131 further comprises wheels along its underside to move the payload module clamp 2000 and the affixed payload module 104 to a desired position relative to the nose and tail sections 101, 103. The pivotable clamping arms 130a, 130b coupling the one side of the payload module 104 is configured to be pivotally actuated between a closed upright position and an open position to permit affixation and removal, respectively, of the payload module 104 vis-à-vis the payload module clamp 2000.

Figure 6E:
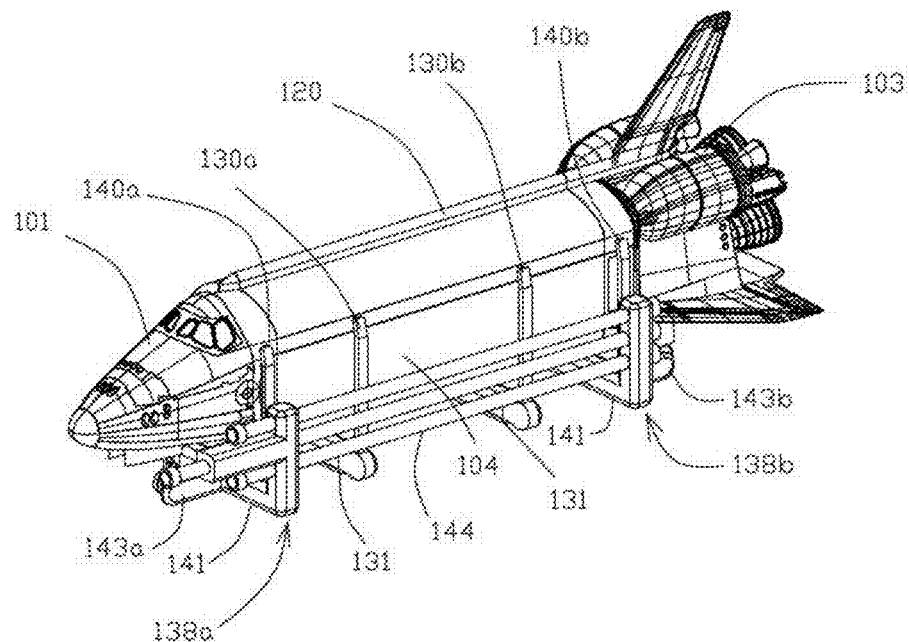
Figure 6F:
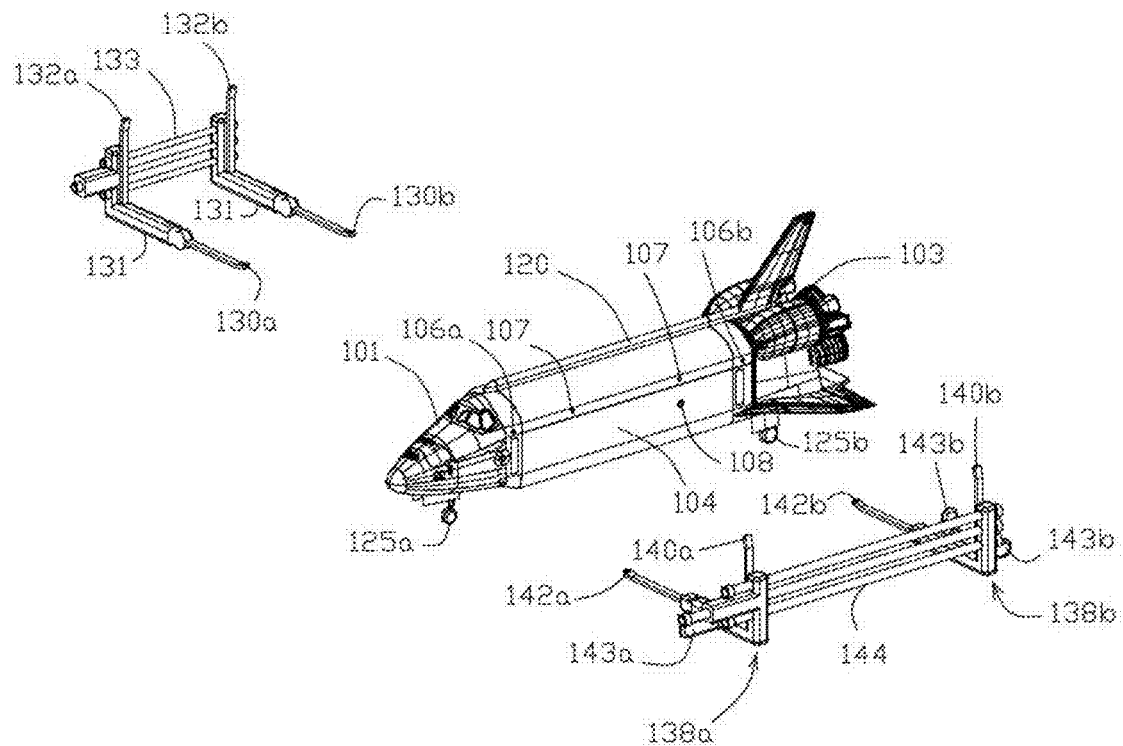

After positioning of the payload module 104 between the nose and tail sections 101, 103 (FIG. 6D), either one or both of the nose and tail sections 101, 103 are slidably displaced towards one another to a second distance that corresponds to the length of the payload module 104. (FIG. 6E). The nose and tail sections 101, 103 are then fixedly attached to the opposing faces of the payload module 104 and a fairing 120 is provided to cover the mast 102, as illustrated in FIG. 6E. Once the payload module 104 is fixedly coupled to the nose and tail sections 101, 103 and the fairing 120 is coupled to the mast 102, the orbiter clamp 1000 is removed and then the payload module clamp 2000 is subsequently removed, as illustrated in FIG. 6F.

The decoupling of the orbiter clamp 1000 and the payload module clamp 2000 may preferably be performed as follows. First, the pivotable clamping arms 142*a*, 142*b* are decoupled from the side wall attachments 106*a*, 106*b*, respectively, and the pivotable clamping arms 142*a*, 142*b* are pivotally actuated approximately 90 degrees to lie substantially parallel with the ground surface. Next, the fixed clamping arms 140*a*, 140*b* are decoupled from the opposing side wall attachments 106*a*, 106*b*. This permits the orbiter clamp 1000 to be slidably removed from the orbiter 100 and affixed payload module 104. Similarly, with respect to the payload module clamp 2000, the pivotable clamping arms 130*a*, 130*b* are decoupled from the side wall attachments 107 respectively, and are pivotally actuated approximately 90 degrees to lie substantially parallel with the ground surface and the fixed clamping arms 132*a*, 132 are decoupled from the opposing side wall attachments 107. This permits the payload module clamp 2000 to be slidably removed from the payload module 104 attached to the orbiter 100.

Figure 9:
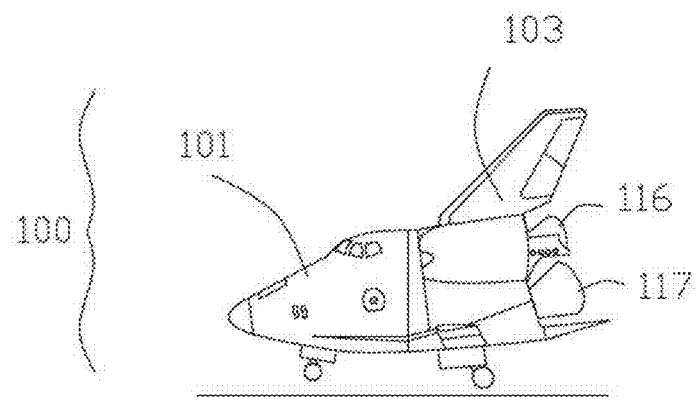
FIG. 9 depicts a retracted orbiter comprising a habitable nose.
Figure 10:
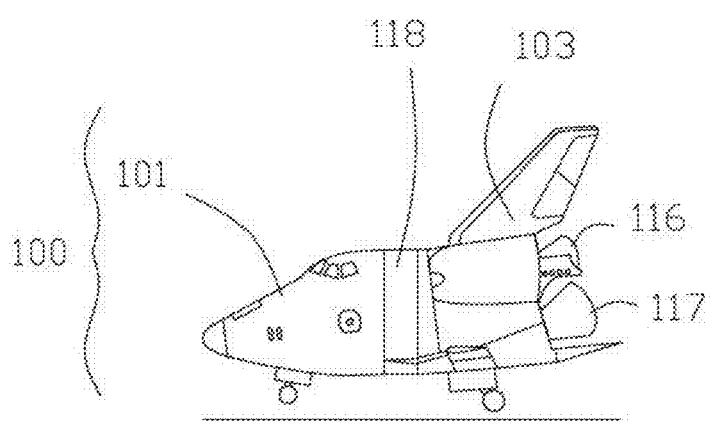
FIG. 10 depicts the retracted orbiter of FIG. 9 further comprising a return payload module that may be integrated with the orbiter.
Figure 11:
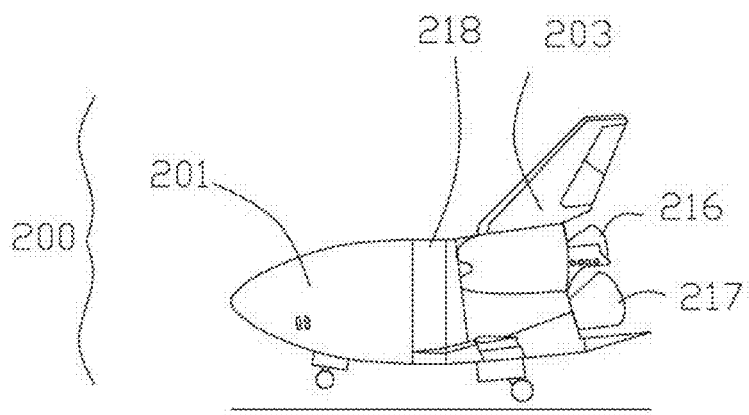
FIG. 11 depicts a drone orbiter comprising a return payload module that may be integrated with the orbiter.

FIGS. 9-11 depict various embodiments of the orbiter in the fully retracted configuration.

The orbiter 100 depicted in FIGS. 9-10 is depicted as comprising a nose section 101 coupled to the tail section 103 via connecting pairs (not shown) peripherally arranged about the facing surfaces of the nose and tail sections 101, 103, respectively. The orbiter 100 is depicted as having forward and rearward landing gears 125*a*, 125*b* as well as orbital maneuvering and de-orbiting engines 116 and launch engines 117. Launch engines 117 are used to launch the orbiter 100 to orbit and the orbital engines 116 are used for orbital maneuvers and de-orbiting. The difference between the orbiter 100 in the two figures is that the orbiter in FIG. 10 further comprises a smaller extra payload module 118 which is integrated with and configured to return with the orbiter 100. Thus, in contrast to the payload module 104 which is completely dissociated from the orbiter 100 before the orbiter 100 makes its return trip, the extra payload module 118 is intended to return with the orbiter 100 to landing. The extra payload module 118 may therefore permit for the return transportation of relatively small items from orbit to its landing site.

It is understood that with respect to the orbiter 100 depicted in FIGS. 9-10, the nose section 101 is a habitable module that is configured to disengage from the mast 102, the payload module 104 and other structures such as external fuel tanks associated with the orbiter 100 upon reaching a minimum altitude. The ability to disengage and rocket away from the mast 102 and tail section 103 and further to deploy parachutes permits an escape sequence in the event of a serious problem or failure detected for the orbiter 100 during launch. It is also understood that if the orbiter is needed to assist in launching the system, then launch engines 117, external tank or tanks 775, and orbital engines 116 would be present. If the orbiter is not needed to add launch thrust, then no external tank 775 or launch engines 117 would be needed. In this case, the orbiter would only have orbital engines 116.

FIG. 11 depicts a retracted drone orbiter 200. In contrast to the habitable nose section 101 of orbiter 100 depicted in FIGS. 9-10, the nose section 201 of the drone orbiter 200 is uninhabitable and houses only controls for the drone orbiter 200 or may house additional payload space. The drone orbiter 200 otherwise comprises essentially the same components as the orbiter 100 of a nose section 201, a tail section 203, an extra payload module 218 disposed between and structurally integrated with the nose and tail sections 201, 203 via connecting pairs (not shown) peripherally arranged about the facing surfaces, and landing gear coupled to the nose and tail sections 201, 203, respectively. Launch engines 217 and orbital engines 216 are similarly provided.

The extra payload module 118, 218 may be provided on the orbiter 100, 200 to store or transport items between the location of launch and the delivery/pick-up destination or to store additional fuel to extend the in orbit mission or reach higher orbits. In this embodiment, the nose section's rearward facing surface couples and engages with forward facing surface of the extra module 118, 218 via connecting pairs in the same manner as the nose section 101, 201 couples and engages with the tail section 103, 203 via connecting pairs.

The principles underlying the construction of the orbiter described herein may similarly be applied to rockets and, more particularly, to solid-fuel or liquid-fuel rockets. This application permits the return of expensive electronics and other components, such as engines, while providing for the disposal of relatively cheaper construction fuel portions.

Figure 14:
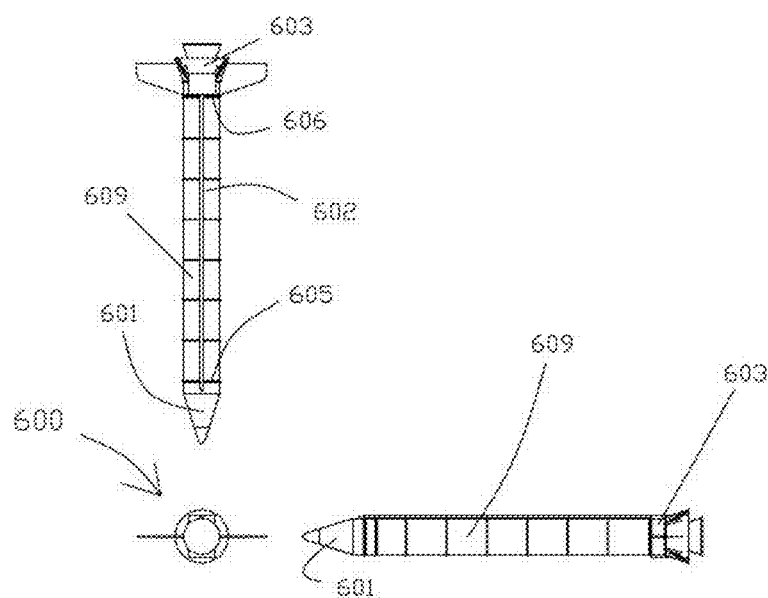
FIG. 14 depicts top, front and side views of a solid-fuel rocket booster.

FIG. 14 depicts a solid-fuel rocket booster 600 comprising a front end 601, an aft end 603 and a retractable mast or boom 602 that ties or connects the front and aft ends 601, 603 together. The fuel section 609 is removably coupled at opposing ends to the front and aft ends 601, 603 in a manner that is similar to how the payload module 104 is coupled to the nose and tail sections 101, 103 of the orbiter 100. Accordingly, the front and aft ends 601, 603 comprise front and aft bulkheads or structural rings 605, 606 which, in turn, comprise complementary ones of the connecting pairs (not shown). In a preferred embodiment, the mast 602 maintains communication and/or power (not fuel) transfer lines coupling the front and aft ends 601, 603. A nozzle is provided at the aft end 603 and is designed to produce the appropriate thrust. In one preferred embodiment, the nozzle may be steerable for guidance. If a solid rocket reaches orbit and is intended to return, then additional attitude control and de-orbiting engines would be added to the system along with heat shields to facilitate the return of the components that are intended to be reused.

Figure 15:
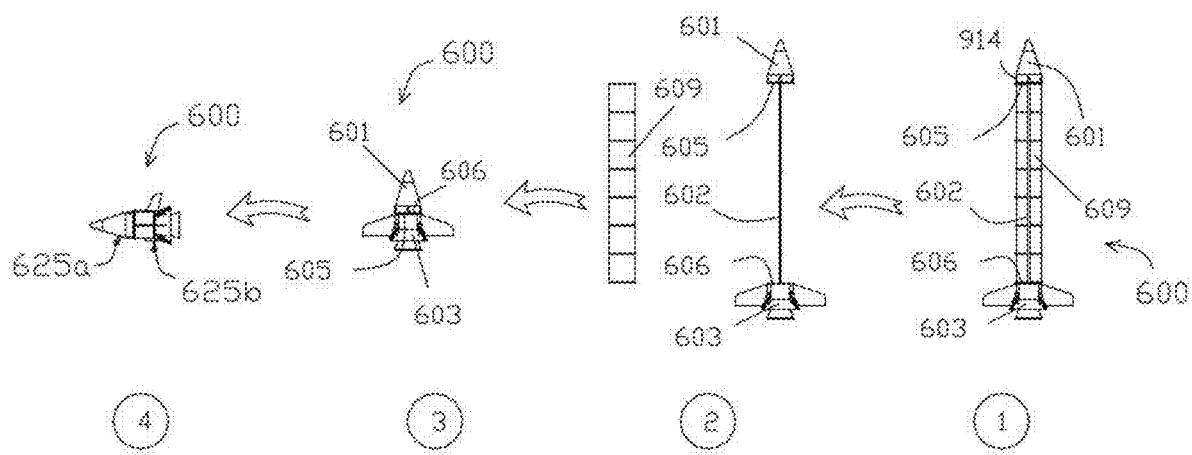
FIG. 15 depicts the sequence of launching a solid-fuel rocket booster and returning a portion of the rocket booster after launch, in which the fuel section dissociates from the rocket booster and the remaining portion of the rocket booster makes its return for landing.

FIG. 15 depicts the sequence of launching a solid-fuel rocket booster 600 and returning a portion of the rocket booster 600 after launch, in which the expended fuel section 609 dissociates from the rocket booster 600 and the remaining portions of the rocket booster 600 makes its return to earth. A rocket booster 600 with an attached fuel section 609 is provided in step 1. Upon reaching a relatively stable point after launch, such as at apogee or the highest altitude prior to returning back, the connecting pairs coupling the opposing ends of the fuel section 609 to the front and aft ends 601, 603 may be disengaged, either sequentially or simultaneously, and the mast 602 may be further extended to provide clearance for the expended fuel section 609 to disengage completely from the rocket booster 600, as shown in step 2. Once the expended fuel section 609 is completely disengaged and dissociated from the rocket booster 600, the mast 602 retracts into a retracted configuration, bringing the front and aft ends 601, 603 together in engagement with one another and locking them together via connecting pairs, as shown in step 3. The landing gear 625a, 625b may then be deployed at the required altitude to facilitate ground landing of the rocket booster 600 without the fuel section 609, as shown in step 4. It is understood that if the solid-fuel rocket 600 is intended to reach orbit, then it would have added orbital and attitude control engines, as well as heat shields, where appropriate, to allow it to re-enter the atmosphere and return to earth Since the sequence of events of dissociating the fuel section 609 from the rocket booster 600 and retracting the mast 602 to couple the front and aft ends 601, 603 may take place in the upper atmosphere and not in orbit, greater loads, such as from the thin atmosphere, are expected to be exerted onto the rocket booster 600 by the force of gravity. The decoupling of the fuel section 609 and retraction of the mast 602 should therefore be timed to be performed when the rocket booster 600 reaches the apogee or the highest altitude prior to descending under the pull of gravity where such forces are significantly decreased. To that end, the rocket booster 600 may be provided with an accelerometer which is able to approximate when the rocket 600 is approaching, is at, or is descending from the apogee and may provide a means to initiate the sequence at the appropriate time. Additionally, the mast 602 may be reinforced with greater structure or rigidity to withstand the increased loads experienced in gravity. Alternatively, a second, or even third or fourth, mast (not shown) running parallel to the mast 602 may be provided to help deal with higher loads than would be experienced in reaching a full orbit and to help reduce the bending loads that would otherwise be experienced with a single mast.

Figure 16:
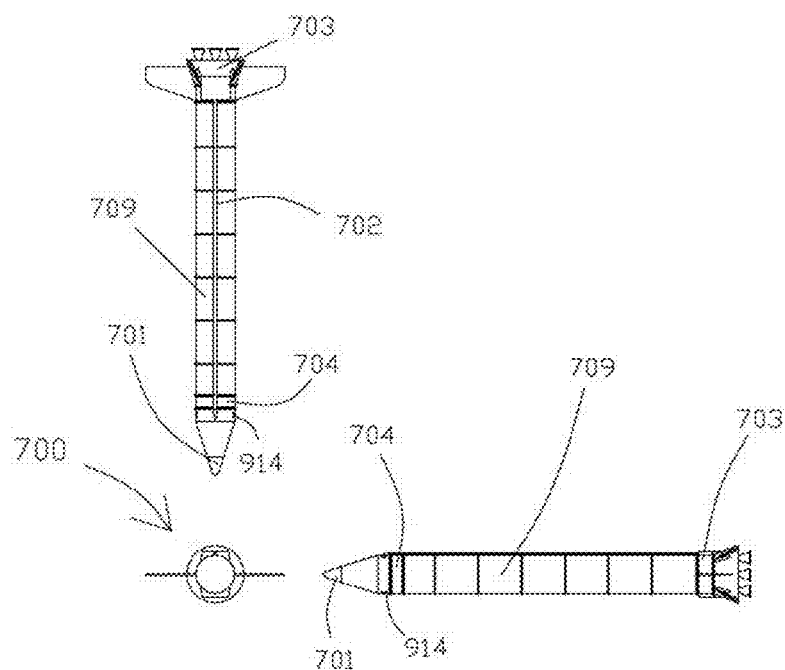
FIG. 16 depicts top, front and side views of a liquid-fuel rocket.

FIG. 16 depicts a liquid-fuel rocket 700 which may be configured in a similar manner as the solid-fuel rocket booster 600. The liquid-fuel rocket 700 comprises a front end 701, an aft end 703 and a telescoping or deployable mast 702 coupling the front and aft ends 701, 703. A payload module 704 and a center portion 709 comprising the fuel and fuel tanks may be provided between the front and aft ends 701, 703. The payload module 704 may be coupled either to the front or aft ends 701, 703 and the opposing ends of the center portion 709 may be coupled to the payload module 704 and one of the front or aft ends 701, 703 to which the payload module 704 is not coupled. The center portion 709 is dissociated from the front and aft ends 701, 703 in the manner described with respect to the solid-fuel rocket booster 600. The mast 702 may then retract and couple the front and aft ends 701, 703 via the payload module 704. The front section 701 may further comprise rockets 914 disposed peripherally to allow for in-orbit maneuvering capability.

Figure 17:
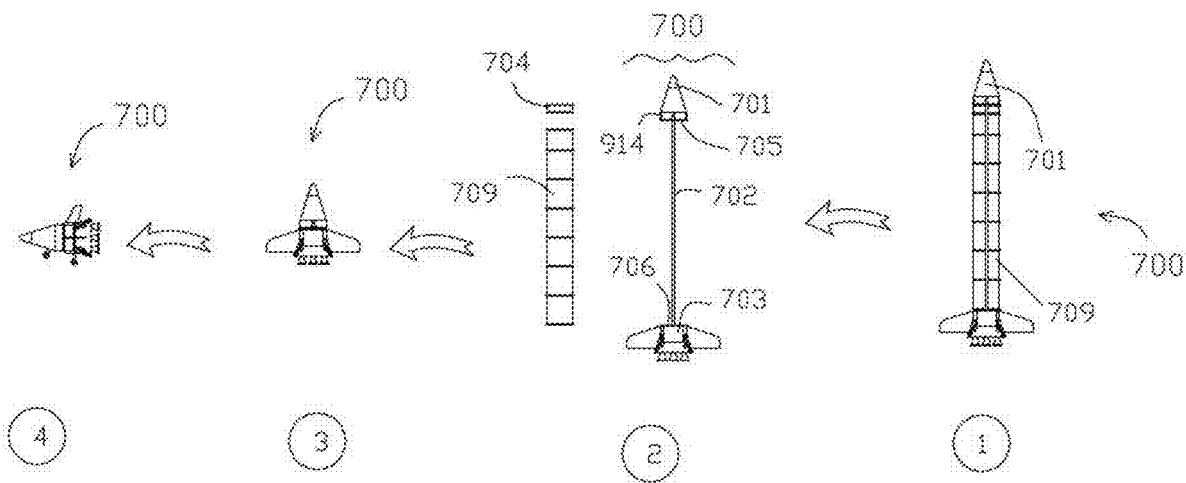
FIGS. 17-18 depict the sequence of launching a liquid-fuel rocket and returning a portion of the rocket without the payload module and the center fuel tanks portion after launch, in which the payload module and the center portion dissociates from the rocket and the remaining portion of the rocket makes its return for landing.
Figure 18:
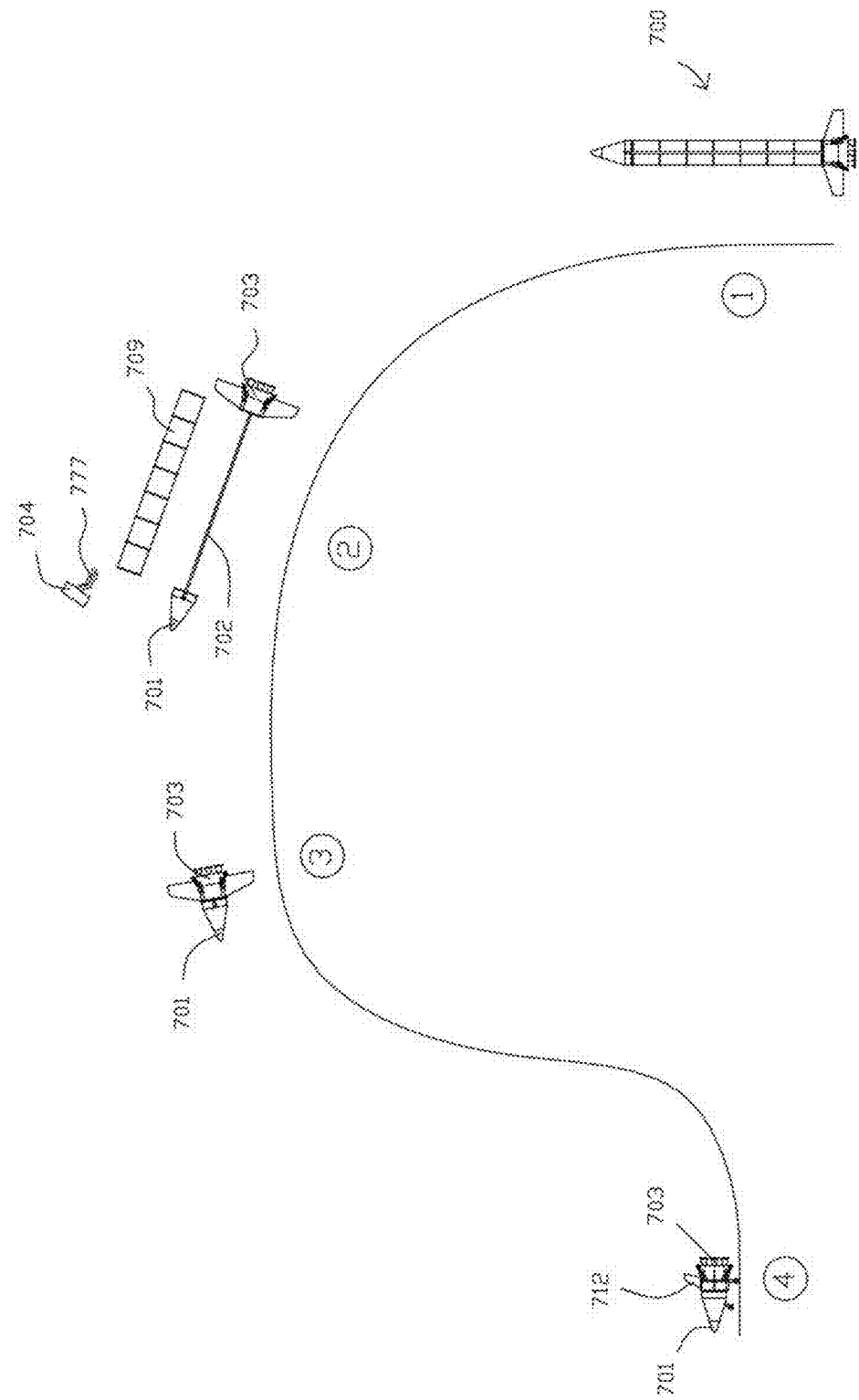

FIG. 17-18 depict the sequence of launching a liquid-fuel rocket 700 and returning a portion of the rocket 700 without the payload module 704 and the center portion 709. A liquid-fuel rocket 700 with the attached payload module 704 fuel section 709 is provided in step 1. Upon reaching a relatively stable point during launch such as at apogee or the highest altitude prior to returning back, the connecting pairs coupling the opposing ends of the fuel section 709 to the front and aft sections 701, 703 may be disengaged either sequentially or simultaneously and the mast 702 may be further extended to provide clearance for the payload module 704 and expended fuel section 709 to disengage completely from the rocket booster 700, as shown in step 2. As further shown in step 2, the payload module 704 may further comprise orbital engines that produce thrust 777 to travel to a desired location. Once the expended fuel section 709 is completely disengaged and dissociated from the rocket booster 700, the mast 702 retracts into a collapsed configuration, bringing the front and aft sections 701, 703 together in engagement with one another by locking together the front and aft structural rings 705, 706, as shown in step 3. The landing gear 725a, 725b may then be deployed to facilitate ground landing of the rocket booster 700 without the payload module 704 and the fuel section 709. It is understood that if the liquid rocket 700 is intended to reach orbit, then it would have added orbital and attitude control engines, as well as heat shields, where appropriate, to allow it to re-enter the atmosphere and return to earth. It is understood that fuel rockets that are used only as booster rockets do not have a payload module 704.

FIGS. 19-22 depict embodiments of the retracted rocket 700 in its landing configuration without the associated payload module 704 and fuel section 709.

Figure 19:
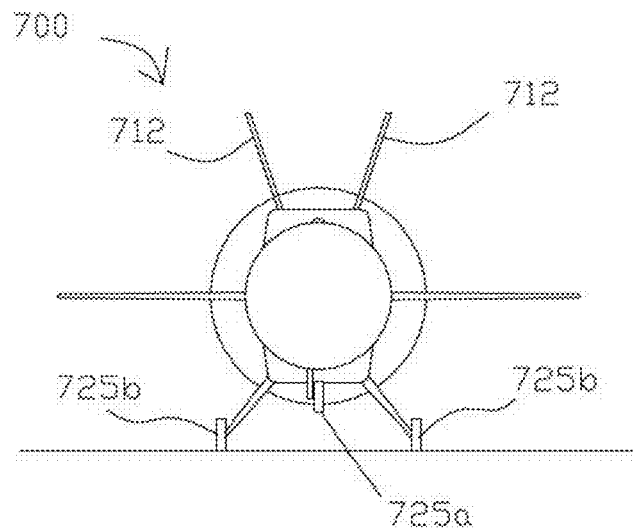
FIG. 19 is a front view of a retracted rocket comprising a wheeled landing gear assembly. The rocket may be used as a booster rocket or a primary payload rocket.
Figure 20:
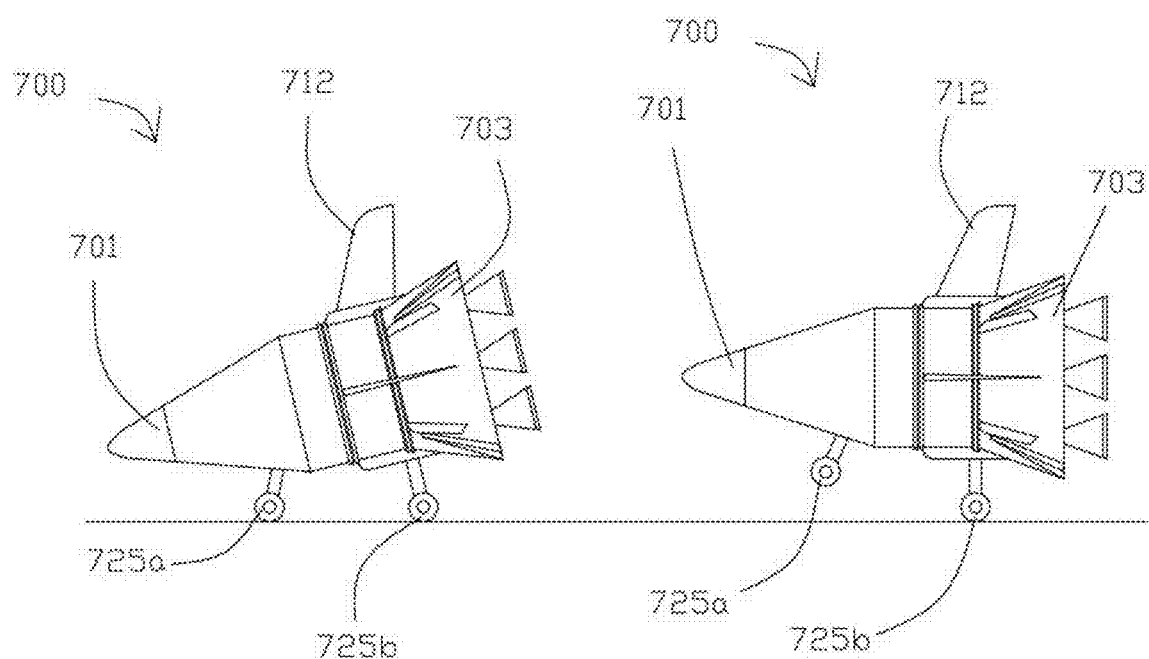
FIG. 20 depicts the landing sequence for the retracted rocket of FIG. 19.
Figure 21:
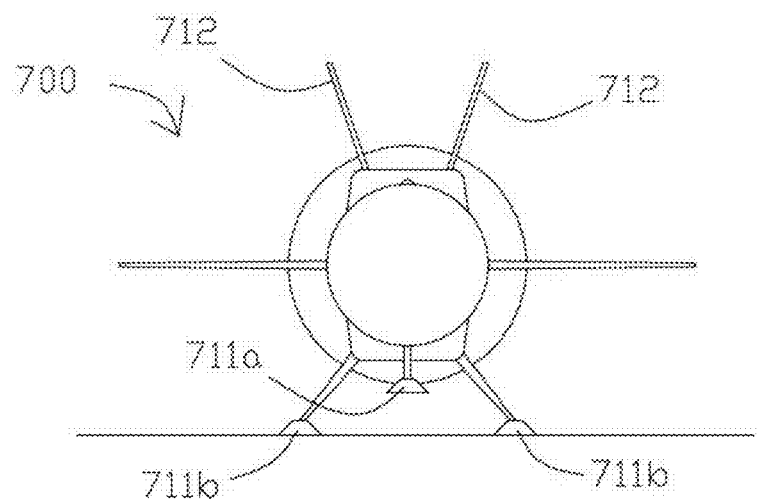
FIG. 21 is a front view of a retracted rocket comprising a skid landing gear assembly. The rocket may be used as a booster rocket or a primary payload rocket.
Figure 22:
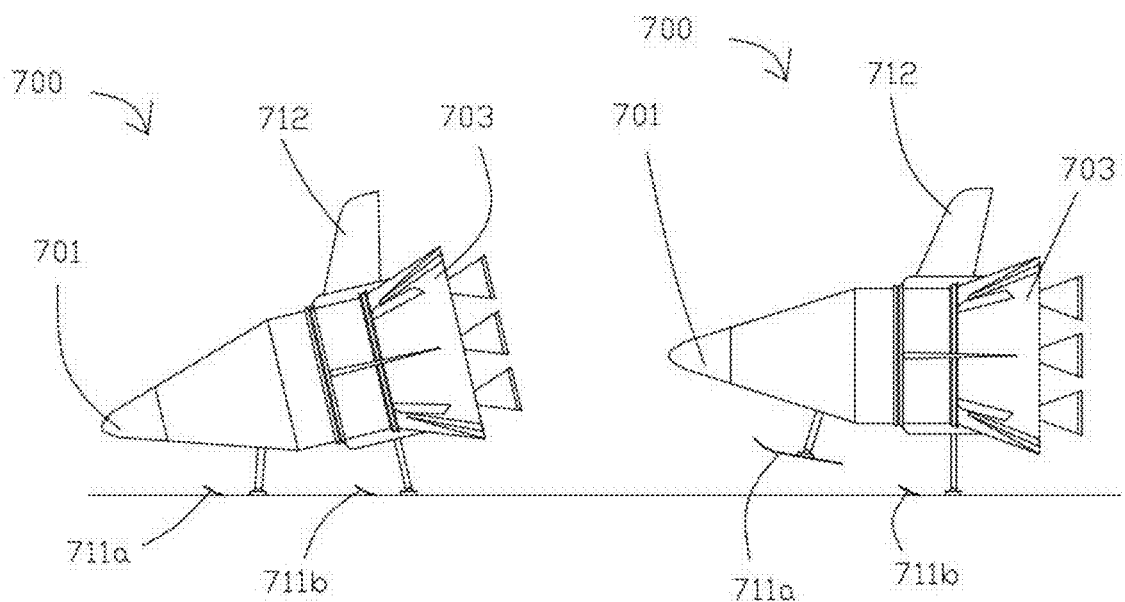
FIG. 22 depicts the landing sequence for the retracted rocket of FIG. 21.

FIGS. 19-20 depict one embodiment of the retracted rocket 700 as comprising a wheeled landing assembly 725a, 725b that is deployable from the front and aft sections 701, 703, respectively, and FIGS. 21-22 depict another embodiment of the retracted rocket 700 as comprising a skid assembly 711a, 711b that is similarly deployable from the front and aft sections 701, 703, respectively. In the retracted configuration depicted in FIGS. 19-20, the liquid-fuel rocket 700 is ready to return to earth for landing via deployed landing gear disposed at both front and aft sections 701, 703. As shown in FIGS. 20 and 22, the landing sequence from right to left is depicted, wherein the aft end landing gear contacts the ground before the front end landing gear contacts the ground. Preferably, the landing gear is stowed within the body of the front and aft sections 701, 703 and is deployed shortly before landing. In the embodiments depicted in FIGS. 19-22, the retracted rocket 700 comprises a plurality of fins 712 disposed externally of the rocket 700 to stabilize the rocket 700 during launch and return. The fins 712 are understood to be permanent structures or stowed and deployed from the rocket 700 when needed. It is understood that these landing configurations, wheels and/or skids are also applicable to the solid rockets 600.

Figure 23:
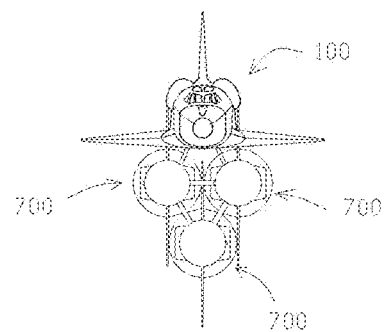
Figure 24:
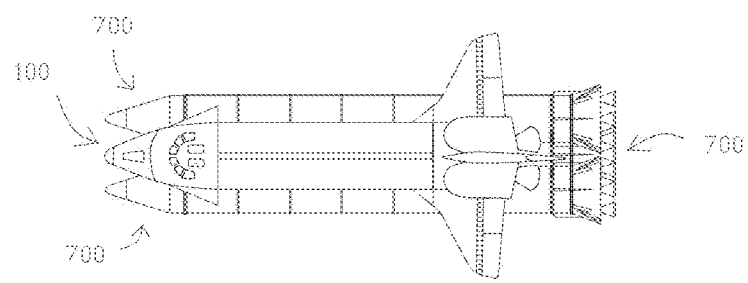
Figure 25:
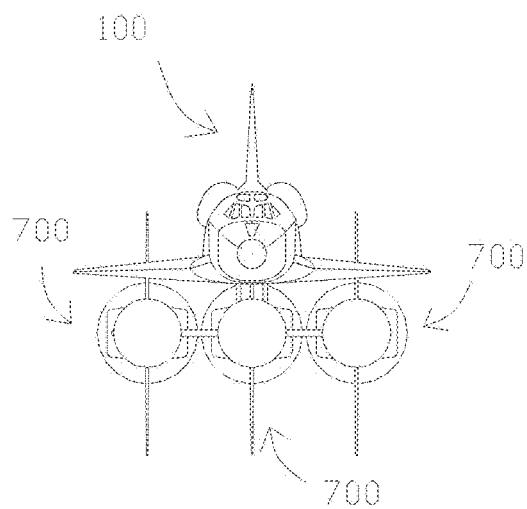
Figure 26:
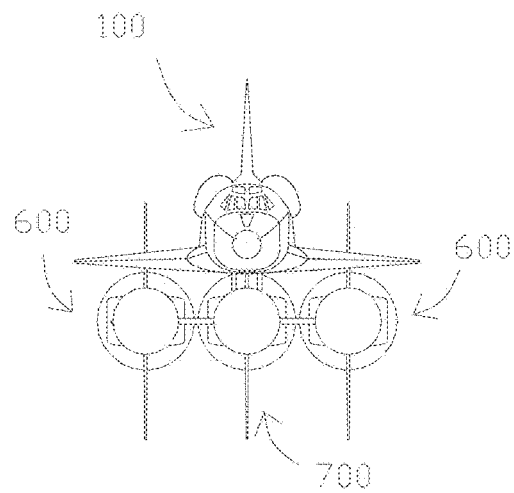

FIGS. 23-28 depict various configurations of coupling one or a combination of the solid-fuel rocket boosters 600 and liquid-fuel rockets 700 to an orbiter 100. FIGS. 23-24 depict the arrangement of three liquid-fuel rockets 700 coupled to the underside of the orbiter 100 in a pyramidal configuration. FIGS. 25-26 depict the side-by-side arrangement of three liquid-fuel rockets 700 (FIG. 25) or two solid-fuel rockets 600 and a liquid-fuel rocket 700 between the solid-fuel rockets 600 (FIG. 26), all coupled to the underside of the orbiter 100. FIGS. 27-28 depict the side-by-side arrangement of four liquid-fuel rockets 700 (FIG. 27) and two solid-fuel rockets 600 with two liquid-fuel rockets 700 between the solid-fuel rockets 600, all coupled to the underside of the orbiter 100.

Figure 29:
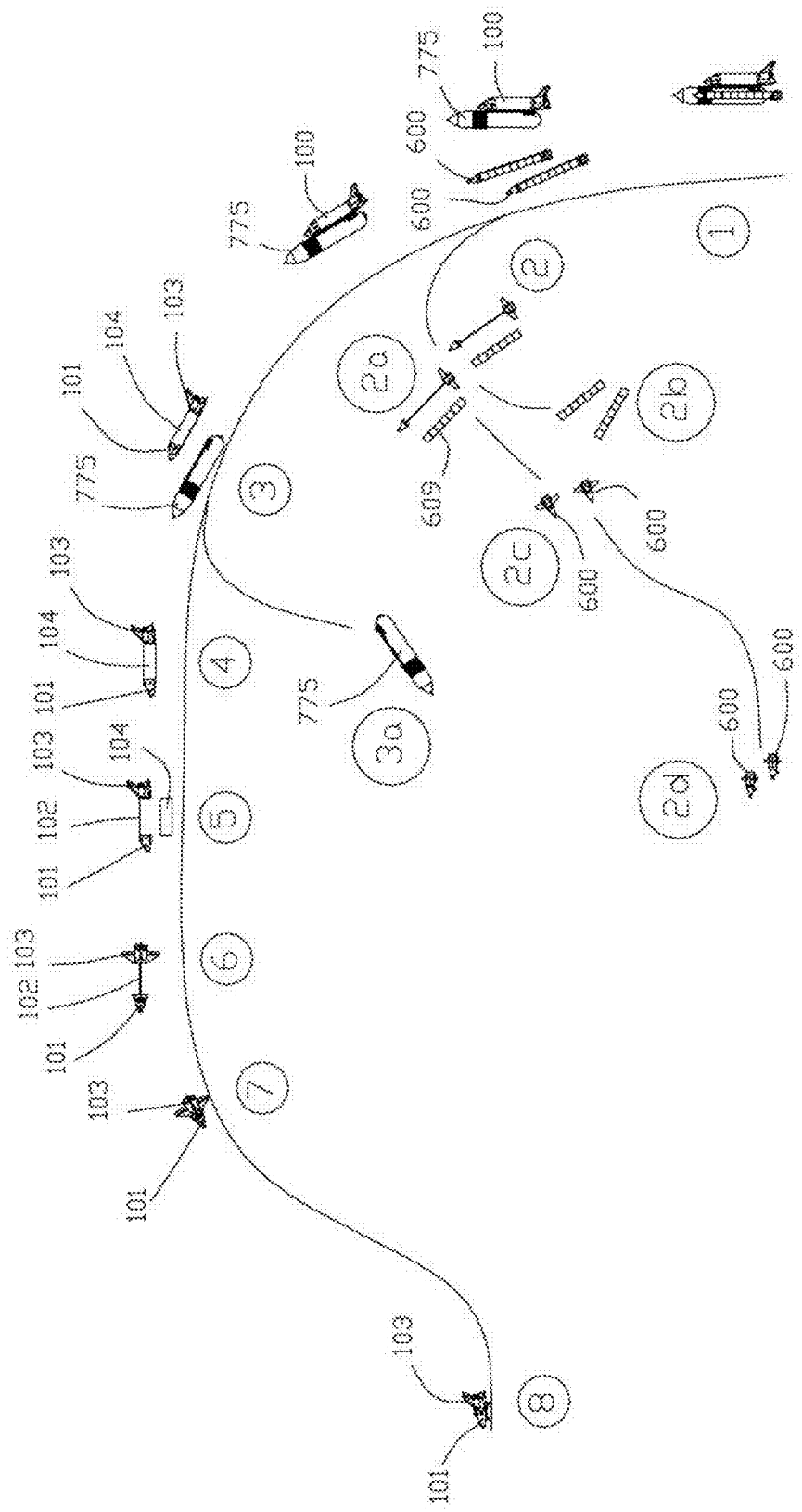
FIG. 29 depicts a mission scenario involving the sequential release of solid-fuel rocket boosters, a fuel tank and a payload module from the orbiter.

FIG. 29 depicts a mission scenario involving the sequential release of the solid-fuel rocket boosters 600, a fuel tank 775 and a payload module 104 from the orbiter 100. At launch (step 1), the orbiter 100, the payload module 104, the solid-fuel rockets 600 and the fuel tank 775 are all coupled together and integrated into a single assembly. Once this assembly is launched and after the fuel from the solid-fuel rockets 600 has been fully or almost fully expended at step 2, the solid-fuel rockets 600 are released from the orbiter 100 and undergo a sequence of events as depicted in steps 2a-2d.

At step 2a, the depleted fuel section 609 dissociates from the solid-fuel rocket 600 and the fuel section 609 descends to the earth at step 2b, preferably into the ocean. The rocket portion 600 without the fuel section 609 continues on step 2c in which the front and aft sections are coupled together by retraction of the mast structure therebetween. The landing gear is then deployed prior to landing and the rocket portion 600 lands at step 2d.

After the orbiter 100 releases the solid-fuel rockets 600 at step 2, the orbiter 100 continues onward, being fueled by the external fuel tank 775 at steps 2 to 3. When the need for the fuel tank 775 is exhausted, the fuel tank 775 is dissociated from the orbiter 100 and descends to the earth at step 3a in a manner similar to the fuel section 609 to burn up and/or land in the ocean.

The orbiter 100 continues on without the fuel tank 775 at steps 3-4 and when it reaches its desired release destination at step 5, it initiates the sequence of events involved in the release of the payload module 104 from the orbiter as described in relation to FIGS. 2A-2E. Once the payload module 104 is completely dissociated from the orbiter 100, the orbiter 100 begins the retraction process as described in relation to FIGS. 2E-2F and prepares for a return and landing as shown in steps 6-7. The retracted orbiter 100 then lands with its landing gear deployed at step 8.

Figure 30:
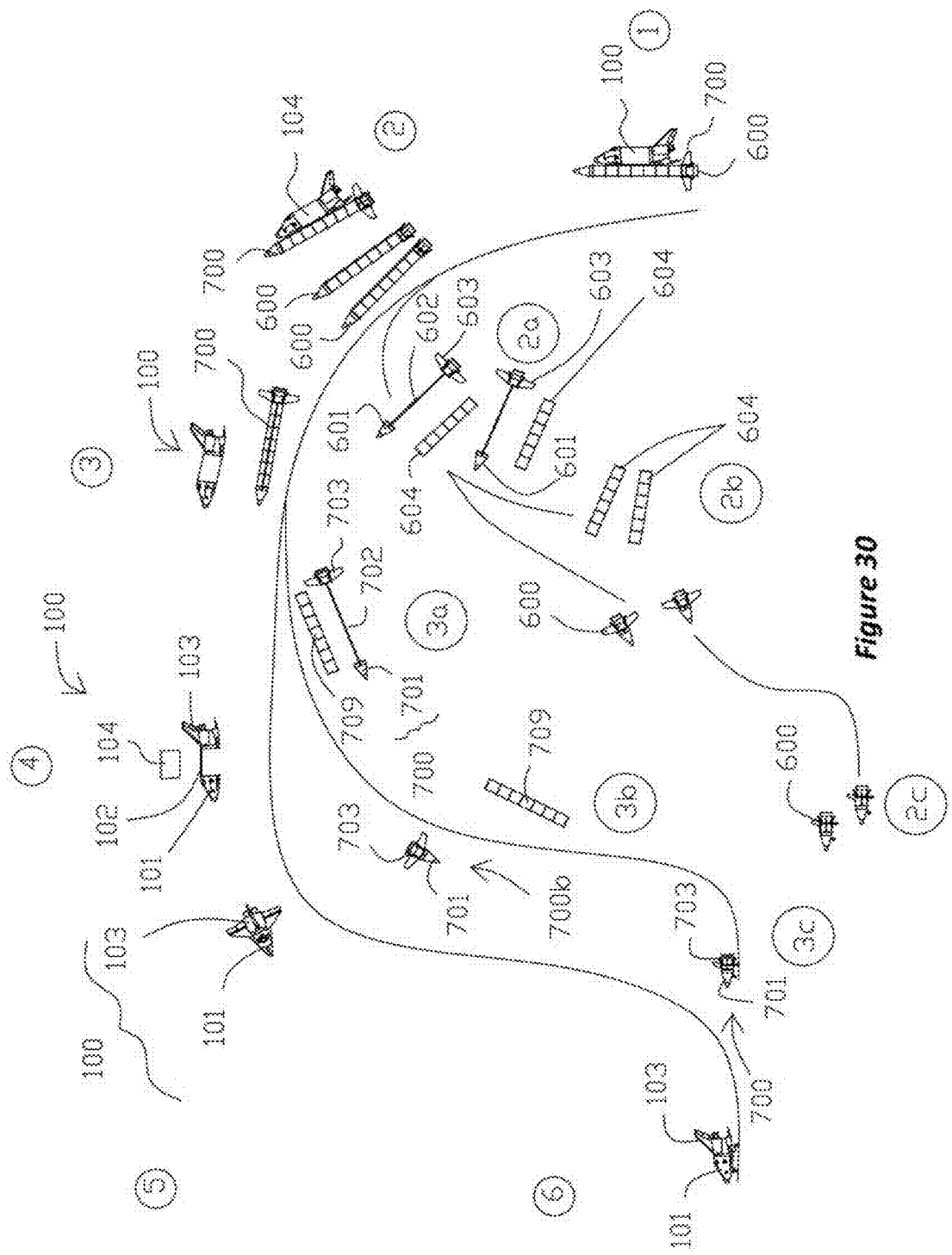
FIG. 30 depicts another mission scenario involving the sequential release of solid-fuel rocket boosters, a liquid-fuel rocket and a payload module from the orbiter.

FIG. 30 depicts another mission scenario involving the sequential release of solid-fuel rocket boosters 600, a liquid-fuel rocket 700 and a payload module from the orbiter 100, similar to the configuration of the launch system in FIG. 26.

At step 1, the orbiter 100 is integrated with a payload module 104 and this assembly is coupled with a pair of solid-fuel rockets 600 and a liquid-fuel rocket 700.

At step 2, the solid-fuel rockets 600, are dissociated from the orbiter 100 and takes their own return path (steps 2a-2c) to earth in which the fuel sections 604 dissociate from the solid-fuel rockets 600 and the front and aft sections 601, 603 are retracted by the mast 602 to a compact landing configuration at step 2b. The landing gear is deployed and the compact solid-fuel rockets 600 land at step 2c.

At step 3, the liquid-fuel rocket 700 is dissociated from the orbiter 100 and takes its own return path (steps 3a-3c) to earth in which the fuel section 709 dissociates from the liquid fuel rocket 700 and the front and aft sections 701, 703 are similarly retracted to a compact landing configuration at step 3b. The landing gear is deployed and the compact liquid-fuel rocket 700 lands at step 3c.

Once the orbiter 100 reaches its release destination at step 4, the payload module 104 dissociates from the orbiter 100 in the manner described in FIGS. 2A-2F. The mast 102 then retracts the nose and tail sections 101, 103 to configure the orbiter 100 in a compact configuration for landing at step 5. The landing gear is deployed just prior to a ground landing at step 6. It is understood that all components returning by re-entry through the atmosphere will require heat shielding.

Figure 31:
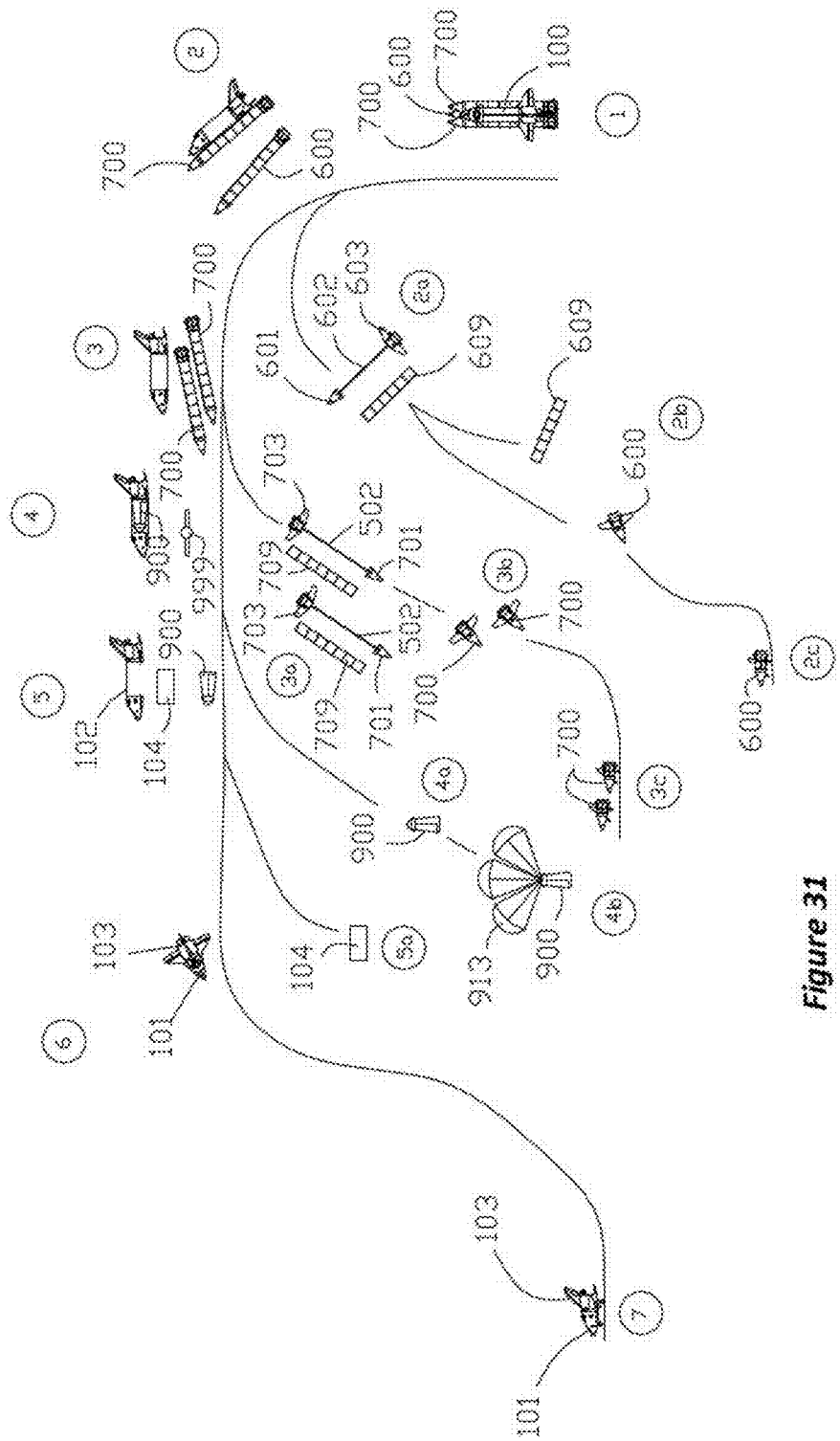
FIG. 31 depicts yet another mission scenario involving the sequential release of a solid fuel rocket booster, a pair of liquid fuel rocket boosters from the orbiter, and a payload module from the orbiter and additionally with the return of an object from orbit via a return capsule.

FIG. 31 depicts yet another mission scenario involving the sequential release, from the orbiter 100, of a solid fuel rocket booster 600 and a pair of liquid fuel rocket boosters 700. Steps 1-3 proceed in the same manner as described in relation to steps 1-3 of FIG. 30.

At step 4, the orbiter 100 approaches a satellite system 999 in need of repair and the orbiter 100 places the satellite system 999 inside the return capsule 900 via one or more mechanical arms (not shown) disposed on either one or both of the nose and tail sections 101, 103. In the mission scenario depicted herein, the orbiter 100 is configured to retrieve a satellite system 999 in orbit by using mechanical arms (not shown) to attach to the satellite system 999 and to place it within the internal cavity of the return capsule 900 while it is still housed within the payload module 104 which, in turn, is coupled with the nose and tail sections 101, 103 of the orbiter. As described in relation to FIGS. 7A-B and 8, the access doors corresponding to both to the payload module 104 and the return capsule 900 are open to permit access to the internal cavity of the return capsule 900.

At step 5, the orbiter 100 first effectuates the release of the return capsule 900 which takes its own return path to earth via steps 4a-4b, in which the return capsule 900 completely dissociates from the payload module 104, deorbits using one or more de-orbiting engines (not depicted) at step 4a and deploys one or more parachutes 913 from its nose section once it reaches a predetermined altitude at step 4b. After dissociating the return satellite 900, the payload module 104 is dissociated from the orbiter 100 and either takes a return path to earth at step 5a or remains in orbit. With respect to the former, the payload module 104 will further need to be provided with deorbiting engines 914 (not shown) in order to exit orbit or at least attitude control engines if the orbiter clamps on to the capsule after the orbiter is in the compact state and executing its de-orbiting maneuver helping to eliminate the need for the capsule to have its own de-orbiting engine. The orbiter would release the capsule just prior to entering the atmosphere or at the point where the capsule is already in a degrading orbit.

The mast 102 then retracts the nose and tail sections 101, 103 together to configure the orbiter 100 in a compact configuration at step 6. The landing gear is deployed just prior to a ground landing at step 7.

Figure 32:
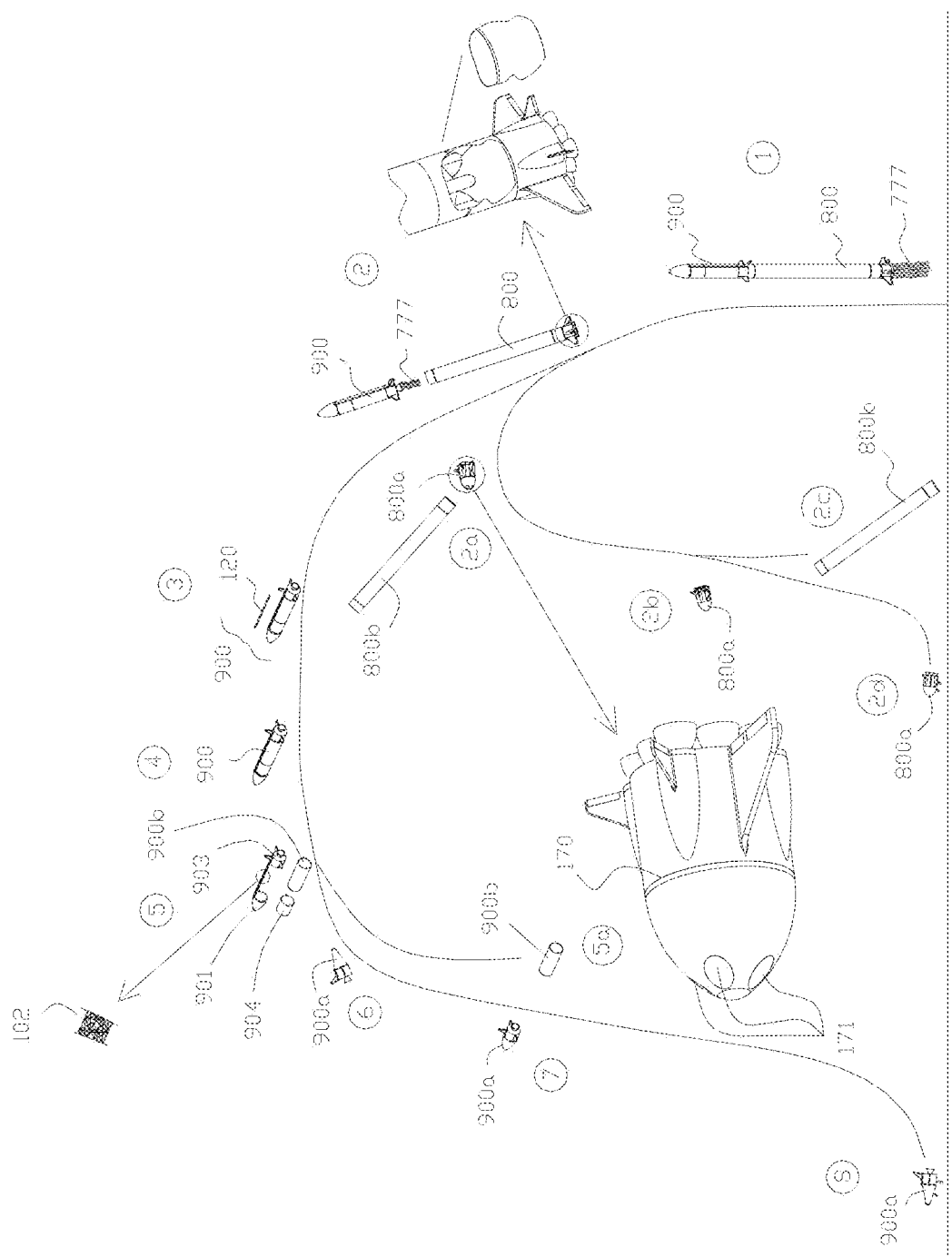
FIG. 32 depicts a mission scenario involving a two-stage rocket.

FIG. 32 depicts a mission scenario involving a two-stage rocket. At step 1, the upper stage 900 and lower stage 800 of the rocket are depicted as being coupled to one another at launch. Once the fuel from the lower stage 800 is expended, it separates from the upper stage 900 at step 2 and takes a separate return path to earth at steps 2a-d.

In step 2a, the lower stage 800 separates into a return vehicle 800a and a disposable fuel tank section 800b. The return vehicle 800a incorporates the electronics and the engines which are desired for reuse. The return portion of 800a has a connecting skirt 170 that attached to the fuel section and access ports 171 that allowed the fuel pipes to penetrate to the engines. As is more fully depicted in the blow out corresponding to step 2, the fuel lines from the upper stage is connected to the return portion 800a via the access ports 171 disposed on the connecting nose 170. Once the fuel potion is released, the fuel access ports 171 are closed for landing. At step 2b, the return vehicle 800a maneuvers for landing while at step 2c, the disposable fuel tank 800b falls to earth, preferably making an ocean landing. The return vehicle 800a deploys its landing gear in preparation for ground landing at step 2d.

At step 3, the fairing 120 surrounding the mast 102 is dissociated from the mast 102 and or retracted at step 4, the front and aft sections expand to release the payload 904 and the excess fuel tanks 900c at step 5. The payload 904 may have its own orbital engines. The mast 102 retracts the front and nose sections 901, 903 together into a compact configuration 900a and executes a de-orbiting maneuver at step 6 and the compact upper stage 900a reenters the atmosphere and maneuvers for landing at step 7. After the landing gear is deployed, the upper stage 900a lands at step 8.

FIG. 33 depicts another embodiment of an upper stage of a two stage rocket in which the front section 901, the payload module 904, the fuel section 900*b* and the aft section 903 are coupled together using an axially actuated pin connection system, as depicted in the exploded view. The diameter of the flange defined by the front section 901 facing the payload module 904 is understood to be larger than the diameter of the mating flange of the payload module 904 so as to provide an overlap with the payload module 904. Preferably, the outer surfaces of the joined front section 901 and the payload module 904 are flush. The diameter of the flange formed by the front section 901 comprises a plurality of spaced apertures or holes 180 which are configured to receive a pin 181 that is actuated radially outward of the payload module 904 via pin actuator 182 disposed underneath the surface of the flange defined by the payload module 904. The payload module 904 is similarly coupled to the fuel section 900*b* by a plurality of cooperating pins 181 actuated between an outwardly deployed state (not shown) and a retracted state (shown).

Once the payload module 904 and the fuel section 900*b* is dissociated from the rocket 900, the fairing 120 is retracted or dissociated from the rocket 900 and the mast 102 is retracted to couple the front and aft sections 901, 903 together. To that end, it is understood that the aft section will comprise a plurality of pins 181 and pin actuators 182 in a spaced arrangement that corresponds to the apertures or holes 180 disposed on the flange formed by the front section 901 to permit the coupling of the front and aft sections 901, 903. The pins 181 may be actuated between a deployed state and a retracted state to permit the release or coupling of the front and aft sections 901, 903.

It is understood that the axially actuated pin connection system described herein may be implemented in the orbiter 100 structure described in relation to FIGS. 2A-2F to couple the nose and tail sections 101, 103 to one another or to a payload module 104. Similarly, it is understood that the axially actuated pin connection system may also be implemented in connection with the solid-fuel 600 or liquid-fuel rockets 700 described in relation to FIGS. 14-15 and FIGS. 16-17, respectively, to couple the front and aft sections to one another or to a fuel or center portion 900*b*.

FIG. 34 illustrates another means by which a dissociated payload module 904*b* may be pushed away from the mast 102 and the rest of the launch system (not shown). The payload module 904*b* may comprise one or a plurality of actuated plates or push rods 190 that are configured to deploy and push against the mast, as depicted in sequence 1 and 2. While the actuated plates or push rods 190 are depicted as being disposed on the two end portions of the payload module 904*b*, it is understood that the actuated plates or push rods 190 may be depicted in any location along the payload module 904*b* along its length. In a preferred embodiment, the actuator plates and/or push rods 190 are mechanically (e.g., spring) actuated, electrically actuated or gas pressure actuated.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

The invention claimed is:

1. A launch system comprising:
 a nose section comprising a nose coupling surface;
 a tail section comprising a tail coupling surface facing the nose coupling surface; and
 a mast coupling the nose and tail sections, the mast being configured to expand and retract to displace the nose and tail sections between a retracted state and one or more expanded states, wherein
  at least one of the nose coupling surface or the tail coupling surface is configured to be releasably secured to a payload coupling surface on a payload module.

2. The launch system of claim 1, wherein the mast weight is less than 10% of the total combined weight of the nose section, the tail section and the mast.

3. The launch system of claim 1, further comprising aerodynamic surfaces located on either one or both of the nose and tail sections, wherein the aerodynamic surfaces are configured such that the launch system, in its retracted state, is capable of effectuating a horizontal landing, wherein the aerodynamic surfaces are configured only to support a load of the launch system for landing in its retracted state and wherein the aerodynamic surfaces are incapable of supporting loads caused by additional payloads in addition to the load of the launch system in its retracted state.

4. The launch system of claim 1, wherein the nose and tail coupling surfaces each comprise complementary ones of a plurality of connecting pairs configured to structurally couple the nose and tail sections to one another or to structurally couple the nose and tail sections to opposing ends of a payload module, wherein the payload module is configured to be released from the launch system after launch and before landing.

5. The launch system of claim 4, wherein the payload module comprises one or a plurality of plates or push rods capable of being actuated to push against the mast after the payload module is released from the launch system.

6. The launch system of claim 4, wherein the nose and tail coupling surfaces comprise first and second circumferential flanges, the first circumferential flange comprising a plurality of pins configured to actuate between a radially deployed state and a radially retracted state and the second circumferential flange comprising a plurality of apertures configured to receive the plurality of pins in the deployed state to couple the nose and tail coupling surfaces, wherein one of the first and second circumferential flanges overlaps the other one of the first and second circumferential flanges.

7. The launch system of claim 6, further comprising a payload module having third and fourth flanges disposed at opposing ends of the payload module, the third and fourth flanges having one or the other of the plurality of pins or apertures to cooperate with one or the other of the first and second flanges of the nose and tail coupling surfaces, respectively.

8. The launch system of claim 1, wherein when the mast is in a first expanded state, the launch system further comprises at least one of a releasable payload module and a releasable fuel module structurally coupled to the nose and tail sections, the payload module and/or the fuel module each being configured to be released from the launch system after launch and before landing.

9. The launch system of claim 8, further comprising one or more arms deployable from one or both of the nose and tail sections, the one or more arms comprising a plurality of pivoted sections and an end portion being configured to releasably couple and manipulate one or both of the payload module and the fuel module structurally coupled to the nose and tail sections.

10. The launch system of claim 8, wherein the payload module comprises a plurality of subunits structurally coupled together by a plurality of connecting pairs.

11. The launch system of claim 8, wherein the payload module comprises a return capsule configured to return an item from orbit, the return capsule comprising an enclosed cavity to house the item, an access door, a heat-of-reentry shield, and orbital engines.

12. The launch system of claim 1, further comprising at least one external fuel source, the at least one external fuel source being releasable from the launch system.

13. The launch system of claim 1, further comprising one or more fuel rockets releasably coupled to the launch system.

14. The launch system of claim 13, wherein each of the one or more fuel rockets comprise a front section, an aft section, and a rocket mast coupling the front section and the aft section, the rocket mast being capable of being actuated to a first expanded rocket state to couple a fuel section between the front section and the aft section, a second expanded rocket state to separate either one or both of the front section and the aft section from the fuel section, and to a retracted rocket state to couple the front section and the aft section together after releasing the fuel section.

15. A method for assembling a payload module to a launch system, the method comprising:
providing the launch system of claim 1;
actuating the mast to a first elongated state in which the nose and tail sections are displaced at a distance that is greater than a length of a payload;
positioning the payload between the nose and tail sections; and
actuating the mast to a second elongated state in which the nose and tail coupling surfaces rigidly attach and engage the payload's forward and rearward facing surfaces, respectively.

16. The method of claim 15, wherein the launch system further comprises orbital maneuvering engines for maneuvering the launch system while in orbit.

17. The method of claim 15, further comprising coupling one or a combination of one or more solid-fuel rockets or one or more liquid-fuel rockets to the launch system.

* * * * *